(12) United States Patent
De Rossi et al.

(10) Patent No.: US 8,989,533 B2
(45) Date of Patent: Mar. 24, 2015

(54) APPARATUS AND METHOD FOR GENERATING FEMTOSECOND PULSES VIA TEMPORAL SOLITON COMPRESSION IN PHOTONIC CRYSTALS

(75) Inventors: Alfredo De Rossi, Paris (FR); Chad Husko, New York, NY (US); Sylvain Combrie, Paris (FR); Chee Wei Wong, Weehauken, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/546,348

(22) Filed: Jul. 11, 2012
(Under 37 CFR 1.47)

(65) Prior Publication Data

US 2013/0177275 A1    Jul. 11, 2013

(51) Int. Cl.
| | | |
|---|---|---|
| *G02B 6/12* | (2006.01) | |
| *G02B 6/00* | (2006.01) | |
| *G02B 6/10* | (2006.01) | |
| *H01S 3/10* | (2006.01) | |
| *H01S 3/00* | (2006.01) | |

(52) U.S. Cl.
CPC ............... *G02B 6/12* (2013.01); *H01S 3/0057* (2013.01); *G02B 2006/1213* (2013.01); *G02F 2202/32* (2013.01)
USPC ............... 385/14; 385/122; 385/130; 372/21

(58) Field of Classification Search
USPC ...................... 385/14, 122, 130; 372/6, 7, 21; 359/326, 332, 344
See application file for complete search history.

(56) References Cited

U.S. PATENT DOCUMENTS

| | | | |
|---|---|---|---|
| 6,856,737 B1* | 2/2005 | Parker et al. | ............... 385/122 |
| 7,123,804 B2 | 10/2006 | Baba et al. | |
| 7,245,801 B2 | 7/2007 | Boyd et al. | |
| 7,418,161 B2* | 8/2008 | Mouli | ............... 385/1 |
| 7,577,324 B2 | 8/2009 | Liu et al. | |
| 7,769,262 B2 | 8/2010 | Oguri et al. | |
| 2005/0213905 A1* | 9/2005 | Yamada | ............... 385/122 |
| 2009/0097512 A1 | 4/2009 | Clowes et al. | |

FOREIGN PATENT DOCUMENTS

EP    2144113    1/2010

OTHER PUBLICATIONS

"Soliton-effect compression of supercontinuum to few-cycle durations in photonic nanowires" by Foster et al, Optics Express, vol. 13, No. 18, pp. 6848-6855, 2005.*
"All-optical regeneration on a silicon chip" by Salem et al, Optics Express, vol. 15, No. 12, pp. 7802-7804, 2007.*

(Continued)

*Primary Examiner* — Robert Tavlykaev
(74) *Attorney, Agent, or Firm* — Hughes Hubbard & Reed LLP

(57) ABSTRACT

Exemplary embodiments of an apparatus, method, and computer readable medium are provided for producing a radiation. For example, a radiation having at least one pulse with a pulse-width of less than approximately 30 picoseconds can be produced using a photonic crystal waveguide arrangement which is (i) specifically structured and sized so as to be placed on an integrated circuit, and (ii) configured to produce the radiation having at least one pulse with a pulse-width of less than approximately 30 picoseconds.

24 Claims, 16 Drawing Sheets

(56) References Cited

OTHER PUBLICATIONS

"Optical solitons in a silicon waveguide" by Zhang et al, Optics Express, vol. 15, No. 12, pp. 7682-7688, 2007.*

"All-optical regeneration on a silicon chip", Salem et al., Optics Express, vol. 15, No. 12, p. 7802-2-7809, Jun. 11, 2007.
"Observation of Pulse Compression in Photonic Crystal Coupled Cavity Waveguides", Karle, et al., Journal of Lightwave Technology, vol. 22, No. 2, p. 514-519, Feb. 2, 2004.

* cited by examiner

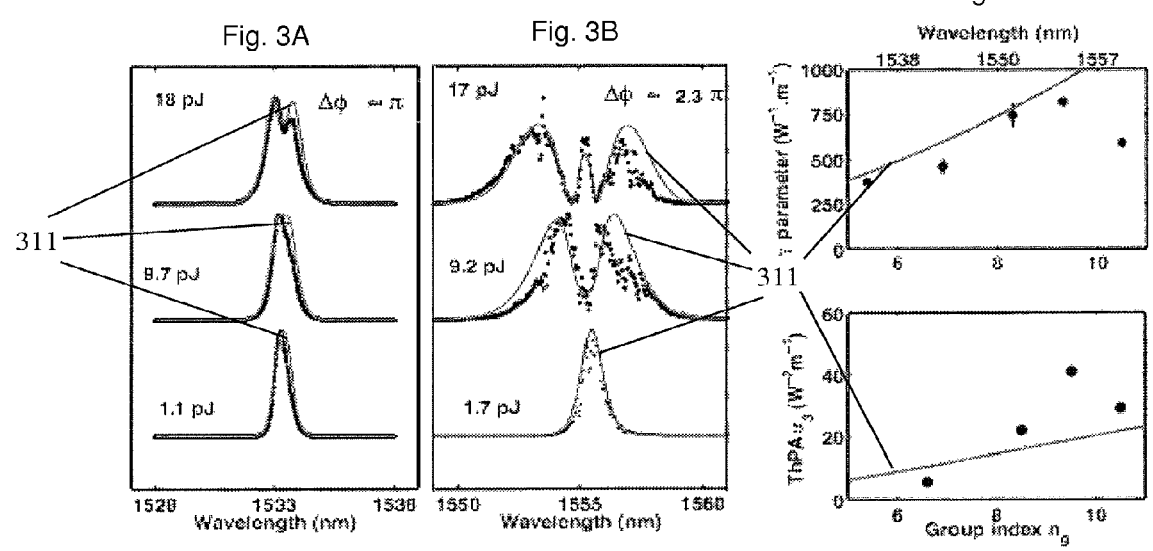

Fig. 4A Fig. 4B Fig. 4C Fig. 4D
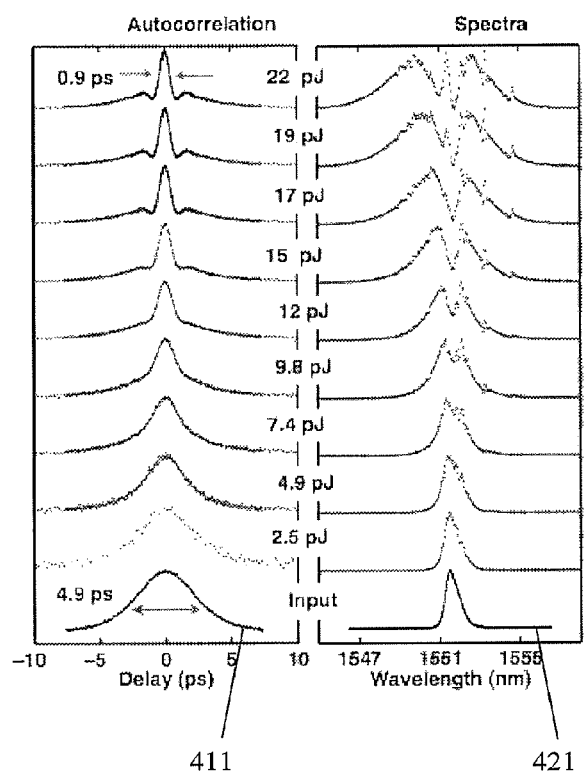
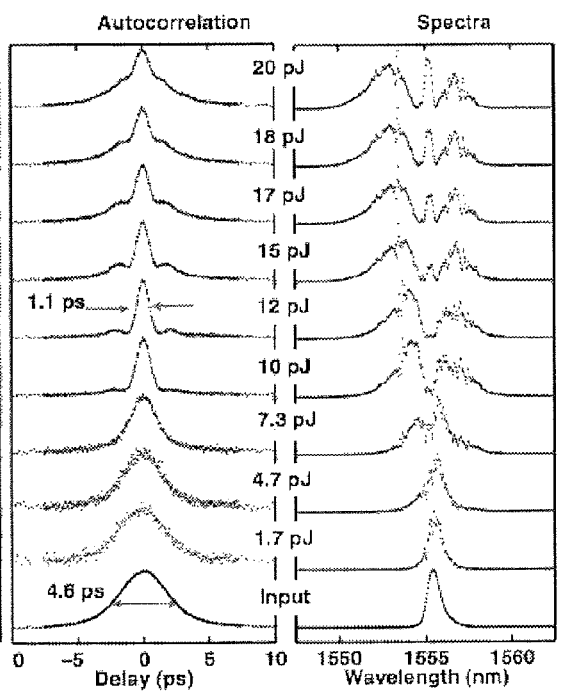

Fig. 6A
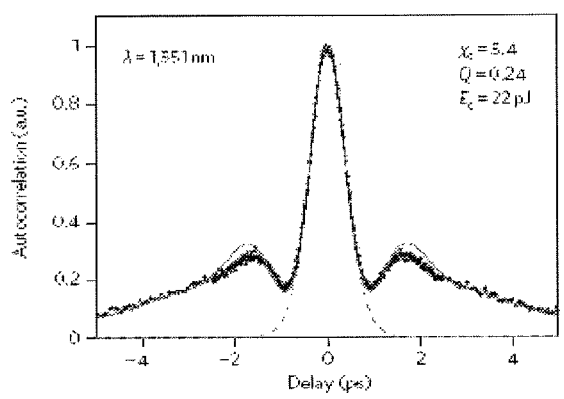
Fig. 6B
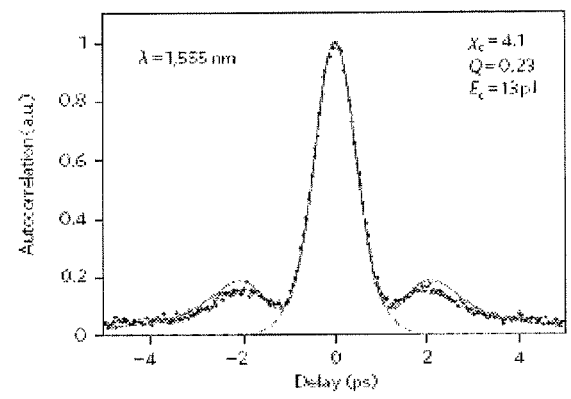
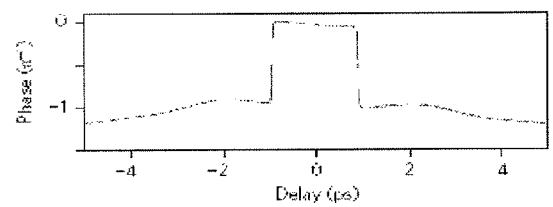
Fig. 6C
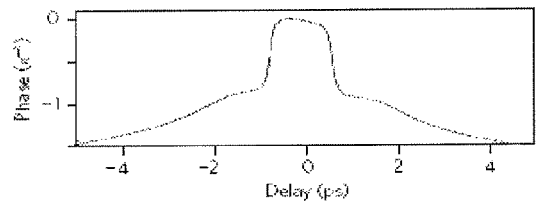
Fig. 6D

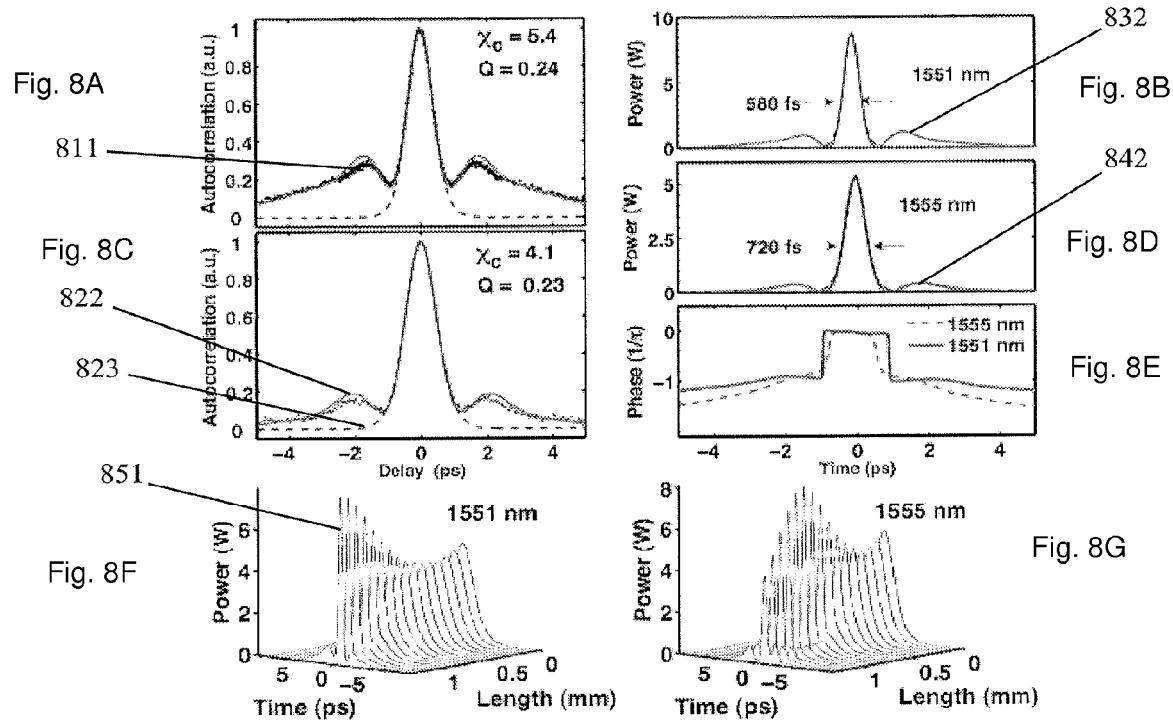

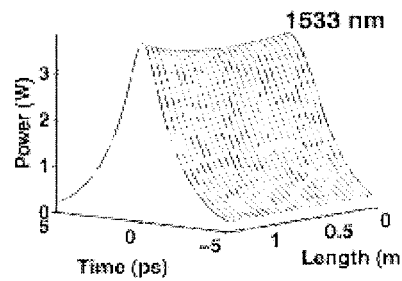
Fig. 12A
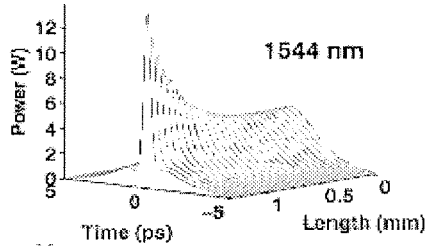
Fig. 12B
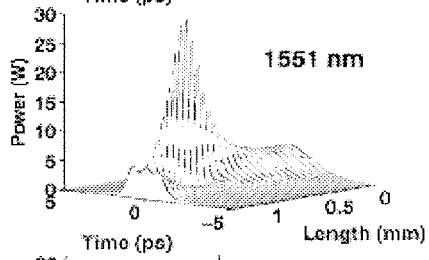
Fig. 12C
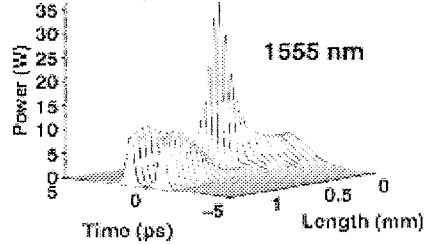
Fig. 12D
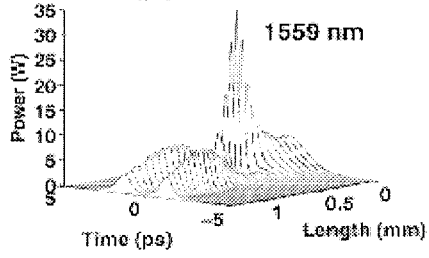
Fig. 12E
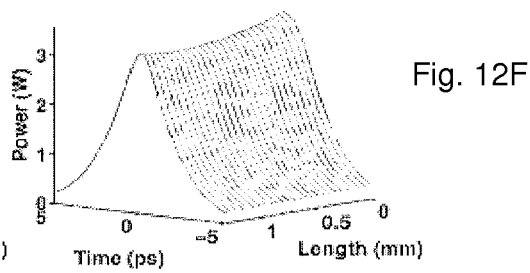
Fig. 12F
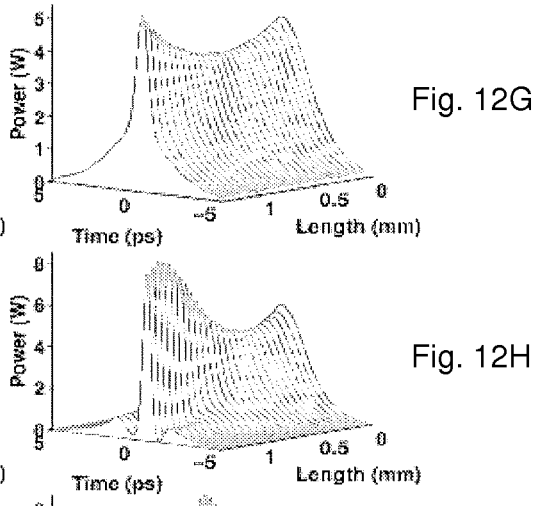
Fig. 12G
Fig. 12H
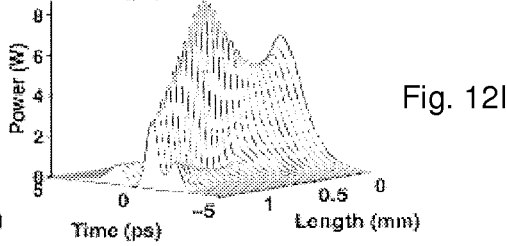
Fig. 12I
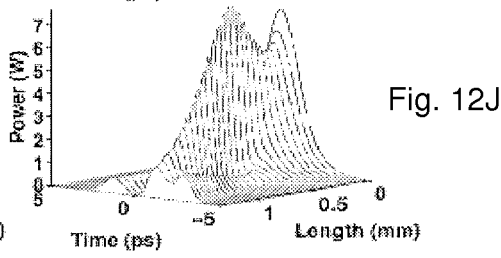
Fig. 12J

APPARATUS AND METHOD FOR GENERATING FEMTOSECOND PULSES VIA TEMPORAL SOLITON COMPRESSION IN PHOTONIC CRYSTALS

STATEMENT REGARDING FEDERALLY SPONSORED RESEARCH

This invention was made with Government support under Contract No. 0747787 and 0725707 awarded by the National Science Foundation. The Government has certain rights in the invention.

CROSS-REFERENCE TO PRIOR APPLICATIONS

This application is a continuation of PCT/US2011/021365, filed Jan. 14, 2011, which claims priority to U.S. Provisional Application Ser. No. 61/295,107 filed on Jan. 14, 2010, each of which is incorporated by reference herein in its entirety.

FIELD OF THE DISCLOSURE

The present disclosure relates to exemplary embodiments of method and apparatus for pulse compression, and more specifically to exemplary method and apparatus for pulse compression using photonic crystal waveguides.

BACKGROUND INFORMATION

With the advent of ever faster telecommunication data rates, it can be important to demonstrate clock speeds at more than approximately 1 THz not limited by, e.g., the optical pulse width, and to do so in a scalable approach. Soliton-effect pulse compression can offer a route to realize femtosecond pulses at multi-GHz repetition rates, in an integrated photonic chip, for example.

The generation of optical solitons can result from, e.g., a delicate balance of anomalous dispersion and positive Kerr nonlinearity (see, e.g., L. F. Mollenauer, R. H. Stolen, and J. P. Gordon, Experimental Observation of Picosecond Pulse Narrowing and Solitons in Optical Fibers, *Phys. Rev. Lett.* 45, 1095 (1980); and J. C. Bronski, M. Segev and M. I. Weinstein, Mathematical frontiers in optical solitons, *Proc. Nat. Acad. Sci.* 98, 12872 (2001)). Soliton-based pulse compression and propagation generally has enabled a large class of ultrafast applications ranging from, e.g., highly-efficient supercontinuum generation (see, e.g., J. M. Dudley, C. Finot, D. J. Richardson, and G, Millot, Self-similarity in ultrafast nonlinear optics, *Nature Physics* 3, 597 (2007); A. V. Gorbach and D. V. Skryabin, Light trapping in gravity-like potentials and expansion of supercontinuum spectra in photonic crystal fibres, *Nature Photonics* 1, 653 (2007); F. Benabid, F. Couny, J. C. Knight, T. A. Birks, and P. St J. Russell, Compact, stable and efficient all-fibre gas cells using hollow-core photonic crystal fibres, *Nature* 434, 488 (2005); and J. M. Dudley, J. R. Taylor, Ten years of nonlinear optics in photonic crystal fibre, *Nature Photonics* 3, 85 (2009)), femtosecond frequency comb metrology (see, e.g., F. Couny, F. Benabid, P. J. Roberts, P. S. Light, M. G. Raymer, Generation and Photonic Guidance of Multi-Octave Optical-Frequency Combs, *Science* 318, 1118 (2007)) and spectroscopy, pulse shaping and regeneration towards terabit optical communications (see, e.g., M. A. Foster, R. Salem, Y. Okawachi, A. C. Turner-Foster, M. Lipson, and A. L. Gaeta, Ultrafast waveform compression using a time-domain telescope, *Nature Photonics* 3, 581 (2009)), to, e.g., soliton squeezing for precision measurements (see, e.g., F. X. Kärtner, D. J. Doughery, H. A. Haus and E. P. Ippen, Raman noise and soliton squeezing, *J. Op. Soc. Am. B* 11, 1267 (1994)). The majority of these advancements have examined nonlinear optical fibers (see, e.g., D. G. Ouzounov, F. R. Ahmad, D. Miller, N. Venkataraman, M. T. Gallagher, M. G. Thomas, J. Silcox, K. W. Koch, and A. L. Gaeta, Generation of Megawatt Optical Solitons in Hollow-Core Photonic Band-Gap Fibers, *Science* 301, 1702 (2003); D. R. Solli, C. Ropers, P. Koonath, and B. Jalali, Optical rogue waves, *Nature* 450, 1054 (2007); D. R. Solli, C. Ropers, P. Koonath, and B. Jalali, Optical rogue waves, *Nature* 450, 1054 (2007); M. S. Kang, A. Nazarkin, A. Brenn and P. St. J. Russell, Tightly trapped acoustic phonons in photonic crystal fibres as highly nonlinear artificial Raman oscillators, *Nature Phys.* 5, 276 (2009); M. Liao, C. Chaudhari, G. i Qin, Xin Yan, T. Suzuki, and Y. Ohishi, Tellurite microstructure fibers with small hexagonal core for supercontinuum generation, *Optics Exp.* 17, 12174 (2009); L. Fu, A. Fuerbach, I. C. M. Littler, and B. J. Eggleton, Efficient optical pulse compression using chalcogenide single-mode fibers, *Appl. Phys. Lett.* 88, 081116 (2006); and M. Foster, A. Gaeta, Q. Cao, and R. Trebino, Soliton-effect compression of supercontinuum to few-cycle durations in photonic nanowires, *Optics Exp.* 13, 6848 (2005)), including, e.g., chalcogenide photonic crystal fibers, that can typically use pulse energies in the range of hundreds of pJ or more and can be several centimeters or more in length, due to the one to two orders of magnitude smaller Kerr nonlinearities ($n_2$) and larger modal areas ($A_{eff}$) compared to integrated photonic chips, hardly amendable to monolithic integration, for example. Optical solitons have been examined in integrated channel waveguides theoretically and recently with experiments, although generally only with spectral-domain measurements (see, e.g., Q. Lin, Oskar J. Painter, and Govind P. Agrawal, Nonlinear optical phenomena in silicon waveguides: modeling and applications, *Optics Exp.* 15, 16604 (2007); R. El-Ganainy, S. Mokhov, K. G. Makris, D. N. Christodoulides, and R. Morandotti, Solitons in dispersion-inverted AlGaAs nanowires, *Optics Exp.* 14, 2277 (2006); J. I. Dadap, N.C. Panoiu, Xiaogang Chen, I-Wei Hsieh, Xiaoping Liu, Cheng-Yun Chou, E. Dulkeith, S. J. McNab, Fengnian Xia, W. M. J. Green, L. Sekaric, Y. A. Vlasov, and R. M. Osgood, Jr, Nonlinear-optical phase modification in dispersion-engineered Si photonic wires, *Optics Exp.* 16, 1280 (2008)).

Laser diodes can be a possible route towards the integration of sub-picosecond optical sources. Recent advancements in monolithic mode-locking based on quantum dots have pushed the pulse widths down to sub-picoseconds (see, e.g., U. Rafailov, M. A. Cataluna, and W. Sibbett, Mode-locked quantum-dot lasers, *Nature Photonics* 1, 395 (2007); M. Kuntz, G. Fiol, M. Laemmlin, C. Meuer, D. Bimberg, High-Speed Mode-Locked Quantum-Dot Lasers and Optical Amplifier, *Proc. IEEE* 95, 1767 (2007); and B. R. Koch, A. W. Fang, O. Cohen, and J. E. Bowers, Mode-locked silicon evanescent lasers, *Optics Exp.* 15, 11225 (2007)), sometimes at the expense of the repetition rate and time-bandwidth product, based on, e.g., the trade-off optimization of the absorber/gain sections for each cavity length.

Photonic crystal lattices can have a group velocity dispersion (GVD; $\beta_2$) of at least five orders of magnitude larger than in optical fibers opening the possibility of soliton compression in approximately 1-mm lengthscales for chip-scale integration. Recent studies have attempted a pulse compression where femtosecond pulses were injected but a broadened output pulse of approximately 1.1-ps was observed (see, e.g., T. J. Karle, Y. J. Chai, C. N. Morgan, I. H. White, and T. F. Krauss, Observation of pulse compression in photonic crystal coupled cavity waveguides, *J. Lightwave Tech.* 22, 514

(2004)) without Kerr nonlinearity and still generally requiring externally pre-chirped pulses, for example. Experimental investigation and development of Soliton dynamics in PhCs has been hindered due to the nonlinear absorption and linear losses until, e.g., recent breakthroughs in PhCs based on III-V semiconductors with mitigated nonlinear absorption (see, e.g., S. Combrié, Q. Vy Tran, C. Husko, P. Colman, and A. De Rossi, High quality GaInP nonlinear photonic crystals with minimized nonlinear absorption, *AppL Phys. Lett.* 95, 221108 (2009); K. Inoue, H. Oda, N. Ikeda, and K. Asakawa, Enhanced third-order nonlinear effects in slow-light photonic-crystal slab waveguides of line-defect, *Optics Exp.* 17, 7206 (2009)) as well as progress in fabrication quality and dispersion control (see, e.g., T. Baba, Slow light in photonic crystals, *Nature Photonics* 2, 465 (2008); and B. Corcoran, C. Monat, C. Grillet, D. J. Moss, B. J. Eggleton, T. P. White, L. O'Faolain, and T. F. Krauss, Green light emission in silicon through slow-light enhanced third-harmonic generation in photonic-crystal waveguides, *Nature Photonics* 3, 206 (2009)). In parallel, theoretical studies have examined, e.g., the stability and dynamics of optical solitons in periodic structures (see, e.g., Y. S. Kivshar and G. P. Agrawal, *Optical Solitons: From Fibers To Photonic Crystals*, Academic Press, San Diego, Calif., (2003); and X.-W. Chen, X.-S. Lin, and S. Lan, Subpicosecond pulse compression in nonlinear photonic crystal waveguides based on the formation of high-order optical solitons, *Chinese Phys.* 14, 366 (2005)), along with measurements on short-pulse propagation in k-space with mutual coupling between eigenstates (see, e.g., R. J. P. Engelen, Y. Sugimoto, H. Gersen, N. Ikeda, K. Asakawa, and L. Kuipers, Ultrafast evolution of photonic eigenstates in k-space, *Nature Phys.* 3, 401 (2007)).

SUMMARY OF EXEMPLARY EMBODIMENTS

Exemplary embodiments of apparatus and method according to the present disclosure can facilitate the utilization and/or generation of femtosecond pulses obtained in highly-dispersive 1.3-mm photonic crystal waveguides coupled with strong $\chi^{(3)}$ nonlinearities and suppressed two-photon absorption via high-order soliton formation and pulse compression. Compression of 3 ps input pulses to a minimum pulse duration of approximately 580 fs (~10 pJ) can be achieved in accordance with exemplary embodiments of the present disclosure. The subwavelength modal confinement (~$10^{-13}$ m$^2$) combined with a slow-light enhancement of the optical field can enable ultralow-threshold pulse compression at millimeter lengthscales, for example. These results can open up, e.g., a robust and simplified route towards GHz femtosecond lasers for ultrafast communication networks and precision metrology, integrated with DFB semiconductor lasers.

Exemplary embodiments of the present can also provide semiconductor highly-nonlinear photonic crystals (PhC) waveguides, for chip-scale integrated solitonic-based optical compression. Soliton pulse compression in photonic chips can further compress pulses generated by laser diodes deeper into the ultrafast regime. It can also bring about an alternative semiconductor approach that can separate the highly-dispersive and nonlinear media from the gain/lasing region.

According to an exemplary embodiment of the present disclosure, an apparatus for producing a radiation can be provided. The exemplary apparatus can include a photonic crystal waveguide arrangement which can be (i) specifically structured and sized so as to be placed on an integrated circuit, and (ii) configured to produce the radiation having at least one pulse with a pulse-width of less than approximately 30 picoseconds. In other exemplary embodiments, the pulse-width of the pulse can be less than approximately 2 picoseconds. Further, the pulse can include an associated pulse energy of less than approximately 100 pico-Joules, and according to other exemplary embodiments, the pulse energy can be less than approximately 10 pico-Joules. Additionally, the pulse can include an associated time-bandwidth product characteristic of less than approximately 0.4.

The exemplary photonic crystal waveguide arrangement can include characteristics that provide at least one non-linearity of at least approximately 300 W$^{-1}$m$^{-1}$ and at least one dispersion of at least approximately 2.5 ps$^2$/m. Further, the photonic crystal waveguide arrangement can include a photonic crystal membrane having a hexagonal lattice, at least one line defect of dielectric characteristic, and a plurality of periodic features. Additionally, the photonic crystal membrane can include a gallium indium phosphide (GaInP) photonic crystal membrane.

The photonic crystal waveguide arrangement of the exemplary apparatus can include structure configured to facilitate a soliton-effect compression, and a size of the photonic crystal waveguide arrangement can be approximately 1 millimeter.

According to another exemplary embodiment of the present disclosure, a method for producing a radiation can be provided. The exemplary method can include generating a first radiation into a photonic crystal waveguide arrangement which can be (i) specifically structured and sized so as to be placed on an integrated circuit, and (ii) configured to receive the first radiation and produce the radiation having at least one pulse with a pulse-width of less than approximately 30 picoseconds. According to other exemplary embodiments, the pulse width of the pulse can be less than approximately 2 picoseconds. Further, an associated pulse energy of the pulse can be less than approximately 100 pico-Joules, or even less than approximately 10 pico-Joules. Additionally, the size of the photonic crystal waveguide arrangement can be approximately 1 millimeter.

According to yet another exemplary embodiment of the present disclosure, a non-transitory computer readable medium can be provided. The non-transitory computer readable medium can include instructions thereon that are accessible by a hardware processing arrangement, wherein, when the processing arrangement executes the instructions, the processing arrangement can be configured to perform at least one procedure, which can include generating a first radiation into a photonic crystal waveguide arrangement which can be (i) specifically structured and sized so as to be placed on an integrated circuit, and (ii) configured to receive the first radiation and produce a further radiation having at least one pulse with a pulse-width of less than approximately 30 picoseconds. According to other exemplary embodiments, the pulse width of the pulse can be less than approximately 2 picoseconds. Further, an associated pulse energy of the pulse can be less than approximately 100 pico-Joules, or even less than approximately 10 pico-Joules. Additionally, the size of the photonic crystal waveguide arrangement can be approximately 1 millimeter.

These and other objects, features and advantages of the present disclosure will become apparent upon reading the following detailed description of embodiments of the disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 3(a)-3(d) are graphs of exemplary nonlinear phase spectral measurements according to exemplary embodiments of the present disclosure;

FIGS. 4(a)-4(d) are graphs of exemplary soliton-based pulse compression at 22 pJ or less pulse energies in 1.3-mm length photonic crystal waveguides according to exemplary embodiments of the present disclosure;

FIGS. 6(a)-6(d) are graphs of exemplary measurements of autocorrelation traces demonstrating the optical soliton formation according to exemplary embodiments of the present disclosure;

FIGS. 8(a)-8(g) are graphs of exemplary characterization of the optical soliton according to exemplary embodiments of the present disclosure;

FIGS. 12(a)-12(j) are graphs of exemplary full simulations of the NLSE at various wavelengths and group indices according to exemplary embodiments of the present disclosure;

Figure 1:
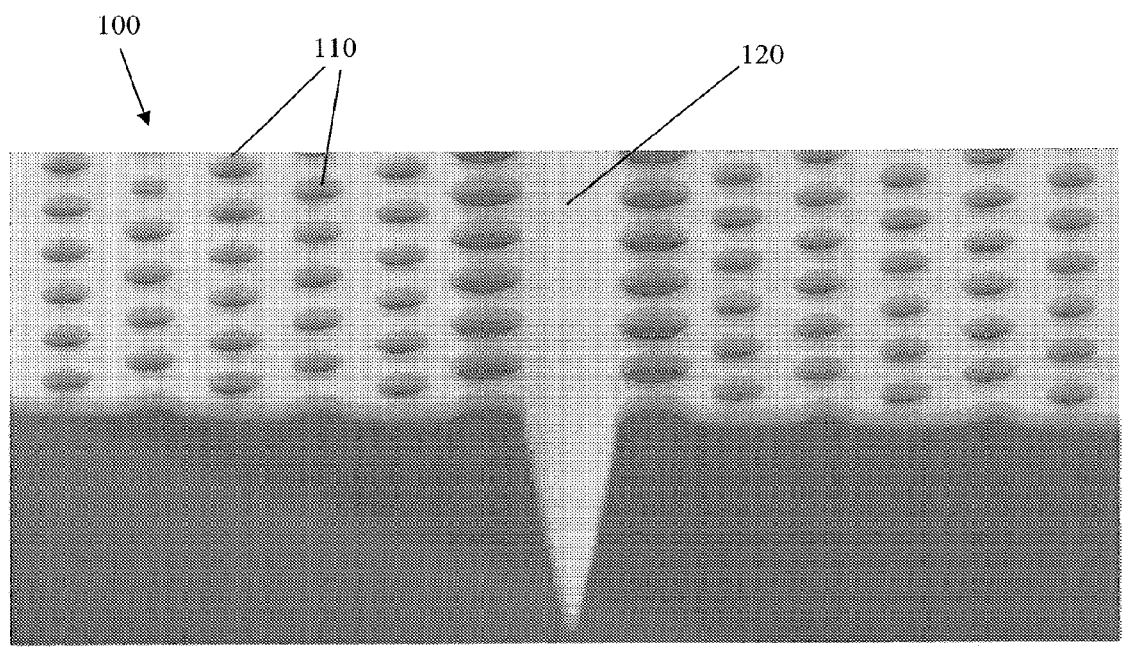
FIG. 1 is an illustration of an photonic crystal membrane according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures.

DETAILED DESCRIPTION OF EXEMPLARY EMBODIMENTS

Figure 2A:
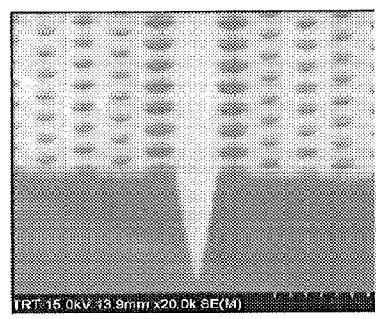
FIGS. 2(a)-2(d) are pictures and graphs of exemplary dispersion and slow-light properties of tuned GaInP photonic crystal waveguides according to exemplary embodiments of the present disclosure.
Figure 2B:
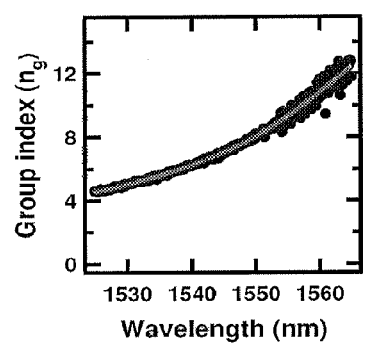
Figure 2C:
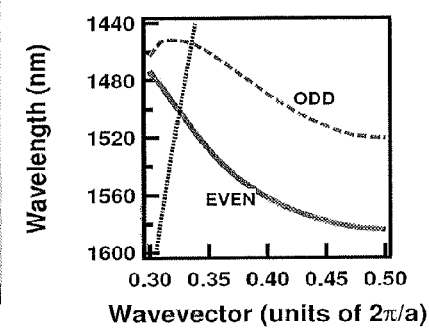
Figure 2D:
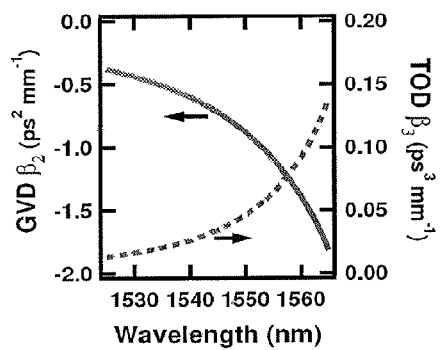

Exemplary procedures in accordance with the present disclosure can be performed in, e.g., a GaInP photonic crystal membrane with a hexagonal lattice constant a of 485 nm, 0.20a hole radius and a approximately 170 nm thickness, that can have an added line-defect of dielectric—or termed a photonic crystal waveguide (see, e.g., T. Baba, Slow light in photonic crystals, *Nature Photonics* 2, 465 (2008); and M. Notomi, K. Yamada, A. Shinya, J. Takahashi, C. Takahashi and I. Yokohama, Extremely large group-velocity dispersion of line-defect waveguides in photonic crystal slabs, *Phys. Rev. Lett.* 87, 253902 (2001))—as shown in FIG. 2(a), for example. FIGS. 2(a)-2(d) show exemplary dispersion and slow-light properties of tuned GaInP photonic crystal waveguides according to exemplary embodiments of the present disclosure. FIG. 2(a) illustrates an exemplary scanning electron micrograph of GaInP membrane with exemplary designed mode adapters. Scale bar: 1 μm. FIG. 2(b) illustrates exemplary calculated bands (3D plane-wave expansion ab-initio computations (see, e.g., G. P. Agrawal, *Nonlinear Fiber Optics*, Academic Press, San Diego, Calif., (2007)) of the exemplary even and odd modes. FIG. 2(c) illustrates an exemplary group index measured (markers) with an exemplary phase-shift technique (see ref. (see, e.g., B. Corcoran, C. Monat, C. Grillet, D. J. Moss, B. J. Eggleton, T. P. White, L. O'Faolain, and T. F. Krauss, Green light emission in silicon through slow-light enhanced third-harmonic generation in photonic-crystal waveguides, *Nature Photonics* 3, 206 (2009)) and fit (solid line). FIG. 2(d) illustrates an exemplary group velocity dispersion (left axis) and exemplary third order dispersion (right) that can be derived from, e.g., exemplary phase-shift group index measurements.

The dispersion can be tuned by increasing the innermost hole radii to approximately 0.22 a. The 1.3-mm PhC waveguide can support two propagation modes (FIG. 2(b)), and can have carefully designed integrated mode-adapters (see, e.g., Q. Tran, S. Combrié, P. Colman, and A. De Rossi, Photonic crystal membrane waveguides with low insertion losses, *Appl. Phys. Lett.* 95, 061105 (2009)) to, e.g., reduce the total input-output chip insertion losses to ~8 dB and suppress facet Fabry-Perot oscillations. Dispersion properties can be measured using the phase-shift technique (see, e.g., S. Combrié, A. De Rossi, L. Morvan, S. Tonda, S. Cassette, D. Dolfi and A. Talneau, Time-delay measurement in singlemode, low-loss photonic crystal waveguides, *Electron. Lett.* 42, 86 (2006)). As shown in FIGS. 2(c) and 2(d), for example, the group index $n_g$ can increase from about 5 to about 13 in the range of interest and the group velocity dispersion (GVD, $\beta_2$) can be negative (anomalous dispersion) and at least five orders of magnitude larger than optical fibers. In these PhC waveguides, the group velocity dispersion-to-loss ratio can be approximately three orders of higher than nanowire waveguides (see, e.g., M. A. Foster, A. C. Turner, M. Lipson, and A. L. Gaeta, Nonlinear optics in photonics nanowires, *Optics Exp.* 16, 1300 (2008)).

FIG. 1 shows an illustration of an exemplary photonic crystal membrane 100 according to exemplary embodiments of the present disclosure. The exemplary scanning electron micrograph of GaInP membrane is shown in FIG. 1 with exemplary designed mode adapters. FIG. 1 is a larger image of the GaInP membrane shown in FIG. 2(a). The exemplary membrane 100 can include a plurality of periodic features 110. In the exemplary embodiment illustrated in FIG. 1, the periodic features 110 are provided as holes. However, it should be understood that other periodic features can be used. Further, the photonic crystal membrane 100 can preferably include a defect 120. The defect 120 can act as the waveguide within the photonic crystal membrane 100 to achieve the ultra-fast pulses according to exemplary embodiments of the present disclosure, e.g., the radiation having a wavelength of less than 30 picoseconds.

The nonlinear and dispersive effects for the optical solitons can be captured by, e.g., two lengthscales, a nonlinear length $$L_{NL}\left(=\frac{1}{\gamma P_o}\right),$$

where the nonlinear parameter $\gamma$ can be $$\frac{n_2 \omega_0}{c A_{eff}} \cdot \left(\frac{n_g}{n_o}\right)^2$$

and $P_o$ can be the pulse peak power) and a dispersion length $$L_D\left(=\frac{T_o^2}{|\beta_2|}\right),$$

where $T_o=T/\Gamma$, T can be the pulse width (FWHM) and $\Gamma=2\sin h^{-1}(\sqrt{2})=1.76$). With 3 ps pulse widths, the dispersion length can range from about 6 mm to about 1.6 mm. The PhC waveguide chips can be designed for the 1.3-mm physical length L to be comparable to $L_D$, in order to support the optical solitons. With increasing input pulse energies, the output pulse can demonstrate the self-phase modulation broadened spectra with a n-phase shift at about 18 pJ pulse energies (~4 W peak power) and group indices of about 5.4 at about 1533 nm, as shown in FIGS. 3(a)-3(d), for example. FIGS. 3(a)-3(d) show exemplary nonlinear phase spectral measurements according to embodiments of the present disclosure. For example, output spectra can be provided as a function of the input pulse energy revealing moderate (e.g., FIG. 3(a) illustrates example of $\lambda$=1533 nm, $v_g$ at c/5.4) and strong (e.g., FIG. 3(b)) illustrates an example of $\lambda$=1555 nm, $v_g$ at c/9.3) broadening due to self-phase modulation. The exemplary spectra can be symmetric (residual modulation can be due to linear transmission) revealing that the dominant nonlinear effect can be the ultrafast Kerr, and that induced carrier dispersion effects can be negligible. The measured effective nonlinearity $\gamma_{eff}$ including the waveguide cross-section and group velocity dependence, such that $\Delta\phi_{NL}=\gamma_{eff}P L_{eff}$, can be shown FIG. 3(c), as well as the exemplary effective three-photon absorption coefficient $\alpha_{3eff}$ in, e.g., FIG. 3(d). The solid lines 311 in the FIGS. 3(a)-3(b) denote the numerical modeling. There can be deviation at the larger group indices as illustrated in FIGS. 3(c) and 3(d) due to, e.g., disorder scattering (see, e.g., R. J. P. Engelen, Y. Sugimoto, H. Gersen, N. Ikeda, K. Asakawa, and L. Kuipers, Ultrafast evolution of photonic eigenstates in k-space, *Nature Phys.* 3, 401 (2007)).

With moderate slow-light group indices of about 9.3 (at about 1555 nm), the π-phase shift can be at lower pulse energies of, e.g., about 7.3 pJ (about 2.5 W peak power) along with a concomitant about 2 times larger spectral broadening for equivalent pulse energies. The nonlinear Kerr parameter $\gamma_{eff}$ can be inferred from the spectral broadening dependence on pulse peak power (see, e.g., C. Husko, S. Combrié, Q. V. Tran, F. Raineri, C. W. Wong, and A. De Rossi, Non-trivial scaling of self-phase modulation and three-photon absorption in III-V photonic crystal waveguides, *Optics Exp.* 17, 22442 (2009); and S. Combrié, Q. Vy Tran, C. Husko, P. Colman, and A. De Rossi, High quality GaInP nonlinear photonic crystals with minimized nonlinear absorption, *Appl. Phys. Lett.* 95, 221108 (2009)).

The measured effective nonlinear parameter $\gamma_{eff}$ can be, e.g., strongly dependent on $n_g$ (as shown in FIG. 3(c)), with the largest value just above, e.g., about 900 $W^{-1}$ $m^{-1}$ at about 1555 nm ($n_g$ of 9.3). At larger group indices (e.g., $n_g$ greater than 10) disorder-induced scattering (see, e.g., M. Patterson, S. Hughes, S. Combie, N.-V. Quynh Tran, A. De Rossi, R. Gabet and Y. Jaouen, Disorder induced coherent-scattering in slow light photonic crystal waveguides, *Phys. Rev. Lett.* 102, 253903 (2009)) and three-photon absorption (see, e.g., C. Husko, S. Combrié, Q. V. Tran, F. Raineri, C. W. Wong, and A. De Rossi, Non-trivial scaling of self-phase modulation and three-photon absorption in III-V photonic crystal waveguides, *Optics Exp.* 17, 22442 (2009)) can begin to limit the effective Kerr nonlinearity and the measured $\gamma_{eff}$ parameter can deviate from theoretical values. As provided herein, for example, the $\gamma_{eff}$ and GVD can be more than five orders of magnitude greater than single-mode fiber (SMF28; $\gamma_{eff}$=1.1× $10^{-3}$ $W^{-1}$ $m^{-1}$ and $\beta_2$=2.2×$10^{-5}$ $ps^2$/mm) (see, e.g., G. P. Agrawal, *Nonlinear Fiber Optics*, Academic Press, San Diego, Calif., (2007)), thus enabling the nonlinear measurements in the pJ regime and at millimeter lengthscales. The GaInP material selection can completely suppress any two-photon absorption due to the large about 1.9-eV band gap, well above the typical energy threshold for two-photon absorption (about 1.6-eV) such that residual effects from band tail absorption can be negligible, as described in, e.g., (see, e.g., S. Combrié, A. De Rossi, L. Morvan, S. Tonda, S. Cassette, D. Dolfi and A. Talneau, Time-delay measurement in singlemode, low-loss photonic crystal waveguides, *Electron. Lett.* 42, 86 (2006); and S. Combrié, Q. Vy Tran, C. Husko, P. Colman, and A. De Rossi, High quality GaInP nonlinear photonic crystals with minimized nonlinear absorption, *Appl. Phys. Lett.* 95, 221108 (2009)). Nonlinear absorption can still occur through the three-photon absorption, but the resulting pulse attenuation can be moderate even at large peak powers, as described herein. The symmetric output pulse spectra (as shown in FIG. 3(b)) can also indicate that three-photon-absorption-induced free-carrier dispersion can be minimal and generally only appear at the relatively larger input powers that can be used and in the more compressed pulses.

Exemplary results of exemplary output pulses directly in the time-domain through second-harmonic intensity autocorrelation are provided as follows. For example, FIGS. 4(a)-4(d) show graphs of exemplary soliton-based pulse compression at 22 pJ or less pulse energies in 1.3-mm length photonic crystal waveguides according to exemplary embodiments of the present disclosure. In particular, FIGS. 4(a) and 4(c) illustrate graphs of exemplary intensity autocorrelation traces of exemplary output pulses for increasing coupled pulse energies from about 1.7 pJ to about 22 pJ and corresponding spectra illustrated in FIGS. 4(b) and 4(d). In FIGS. 4(a) and 4(b), graphs show exemplary mode-locked pulses are provided which are centered at about 1551 nm ($n_g$ of about 8.3). A minimum pulse width of about 580 fs ($sech^2$ deconvolved; about 1.54 factor) can be achieved, for example. Exemplary input pulse traces are also shown by lines 411, 421. In FIGS. 4(c) and 4(d), graphs shown exemplary mode-locked pulses are provided which are centered at about 1555 nm ($n_g$ of about 9.3). A minimum pulse width of about 700 fs can be achieved. Due to, e.g., the strong exemplary $\chi^{(3)}$ nonlinearity and exemplary wavelength-scale confinement, an exemplary minimum energy of about 12 pJ can enable about 700 fs compression on a 1.3-mm length scale, for example.

FIGS. 4(a) and 4(c) show graphs of an exemplary series of traces at about 1551 nm ($n_g$ of about 8.3) and about 1555 nm ($n_g$ of about 9.3), respectively, for increasing pulse energies (as described herein). A signature of pulse width narrowing can be observed. The autocorrelation trace widths (FWHM) can decrease from an input duration of approximately about 4.9 ps to a minimum of about 900 fs at about 22 pJ, for a compression ratio, $\chi_c(=T_o/T_{comp})$, of about 5.4, for example. Employing an autocorrelation deconvolution factor of about 1.54 for hyperbolic secant pulses (direct extraction as described herein below and can also match exactly), this implies that the pulse width can be reduced from about 3.2 ps to about 580 fs. At larger pulse energies, such as those of, e.g., FIG. 4(a), a single side lobe can begin to emerge, which can be indicative of, e.g., higher order soliton dynamics. The measurements at about 1555 nm can provide a slightly broader minimum pulse width (e.g., about 1.1 ps from autocorrelation; about 700 fs deconvolved). The minimum width can occur at only about 12 pJ pulse energy, approximately one half the energy compared to about 1551 nm, and more than about 17 times lower than even the highly nonlinear chalcogenide bulk fibers (see, e.g., L. Fu, A. Fuerbach, I. C. M. Littler, and B. J. Eggleton, Efficient optical pulse compression using chalcogenide single-mode fibers, *Appl. Phys. Lett.* 88, 081116 (2006)) due to, e.g., the significantly larger $\gamma_{eff}$ nonlinear parameter in this example. Above about 15 pJ, the autocorrelation trace can deviate from a bell shape considerably and, consequently, employing FWHM as a measure of the pulse duration can be inappropriate and these few points are thus not included in the exemplary quantitative analysis example that follows. Also plotted in the following example are the accompanying spectral properties in, e.g., FIGS. 4(b) and 4(d). Increased spectral broadening with pulse energy can be clearly visible in this example.

FIGS. 5(a)-5(d) show graphs of exemplary measurements demonstrating the optical soliton formation.

Figure 5A:
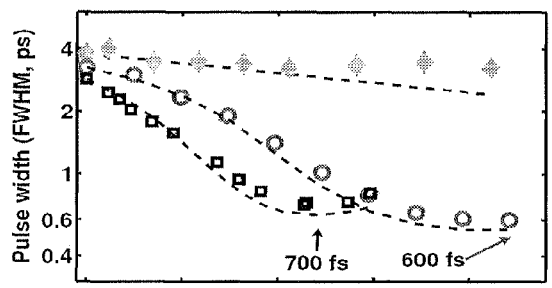
FIGS. 5(a)-5(d) are graphs of exemplary measurements demonstrating the optical soliton formation according to exemplary embodiments of the present disclosure.

In particular, FIG. 5(a) shows a graph of an exemplary measured pulse width for the range of pulse energies and group velocities examined. Indeed, this figures illustrates a graph indicating exemplary measured (symbols) pulse widths after autocorrelation deconvolution versus the coupled pulse energy, at different group indices of 6.9, 8.4, and 9.3 at wavelengths 1544 nm (diamonds), 1551 nm (circles), and 1555 nm (squares) respectively. Dashed lines represent exemplary numerical results from the exemplary nonlinear Schrödinger model including up to third-order dispersion and three-photon nonlinear absorption. Three distinct regimes are identified in this example, e.g.: (a) negligible pulse width change with pulse energy (at about 1544 nm with $n_g$ of about 6.9); (b) pulse width decreases with energy monotonically down to about 600 fs (at about 1551 nm with $n_g$ of about 8.3); and (c) minimum pulse width (about 700 fs) achieved for an exemplary optimal value of the pulse energy (at about 1555 nm with $n_g$ of about 9.3 and at about 1559 nm with $n_g$ of 10.5). Soliton propagation, a regime in which the self-phase-modulation-induced phase distortion can virtually compensate for GVD, can occur when the pulse energy W is matched to the fundamental soliton energy $W_0$, where $W_0 = 3.1\beta_2/(\gamma_{eff} T_{FWHM})$. At larger input energies, the formation of higher-order solitons, which can be characterized by N [$N^2 = W/W_0$], can lead to notably different pulse evolution. In particular, the higher-order solitons can undergo periodic modulation with soliton period $z_0 = \pi L_d/2$, as well as temporal pulse compression. In addition, larger N numbers can experience greater compression and evolve on shorter lengthscales (see, e.g., G. P. Agrawal, *Nonlinear Fiber Optics*, Academic Press, San Diego, Calif., (2007); and L. Mollenauer, R. Stolen, J. Gordon, and W. Tomlinson, Extreme picosecond pulse narrowing by means of soliton effect in single-mode optical fibers, *Optics Lett.* 8, 289 (1983)). For a given N there consequently can exist an optimal distance $z_{opt}$ at which the pulse experiences a minimum width. In an exemplary system in accordance with the present disclosure, $W_0$ can be about 0.9 pJ (about 1544 nm), about 1.1 pJ (about 1551 nm), about 1.3 pJ (about 1555 nm) and about 1.4 pJ (about 1559 nm). In this example solitons with order N up to 4—thus about 16 times more energy than required to sustain a fundamental order soliton—can be launched into the waveguide for compression.

Figure 5B:
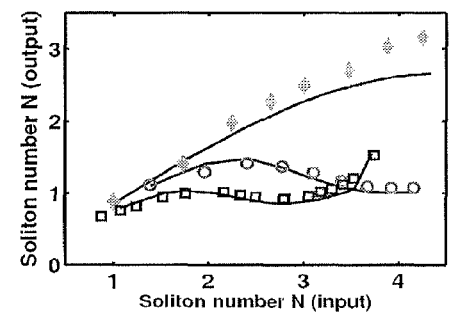

An exemplary time-bandwidth product of the compressed pulses is illustrated in FIG. 5(b). FIG. 5(b) illustrates a graph providing exemplary time-bandwidth product. Exemplary temporal pulse width can be constant in the case $\lambda$ of 1544 nm, consistent with $L_d \gg L$; however the bandwidth increases, as shown in this example. Soliton compression with near constant time-bandwidth product can be observed at $\lambda$ of 1551 nm. At the slower group velocities at 1555 nm and 1559 nm, this exemplary regime can break down at larger energies in some examples (e.g., greater than ~17 pJ), where the nonlinear absorption can become important and remove energy from the optical soliton. For $\lambda$ at about 1544 nm the product can be initially close to about 0.35, a near ideal hyperbolic secant, and increase monotonically with the input energy due to, e.g., nonlinear pulse broadening and relatively weak dispersion. Interestingly, for $\lambda$ at about 1551 nm, the resulting exemplary time-bandwidth product can remain between about 0.30 to about 0.36, close to the about 0.315 transform limit, and maintain this limit throughout the range of coupled energies. The exemplary model in accordance with the present disclosure (e.g., represented by the solid line in FIG. 5(b)) in this example, described in further detail herein below, can reproduce this behavior with excellent quantitative agreement. The time-bandwidth product can remain almost constant because, e.g., the input pulse can be compressed adiabatically, without introducing additional chirp, which can be the essence of the soliton compression in some exemplary embodiments. The about 1555 nm curve follows a similar trend, which begins to increase above about 15 pJ due to, e.g., deviation from the optimal $z_{opt}$.

Figure 5C:
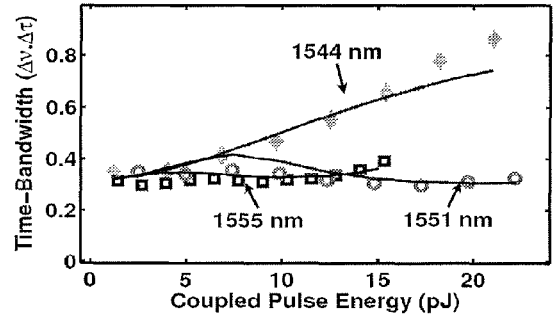

It can also be important to consider the role of nonlinear absorption in the propagation dynamics, for example. FIG. 5(c) shows an exemplary estimated soliton number N of the output pulse versus the input value. When substantial compression is achieved, at about 1551 nm and about 1555 nm, the value of N at output can be about 1, suggesting that a fraction of the pulse energy can be dissipated, in contrast to the ideal higher-order soliton dynamics. This can suggest that the nonlinear absorption effectively adjusts the maximum peak intensity and removes excess energy as the pulse propagates. The approximately 1544 nm measurements greatly contrasts with the approximately 1551 nm case, where the N number remains largely unchanged due to significantly weaker nonlinear and dispersion effects.

Figure 5D:
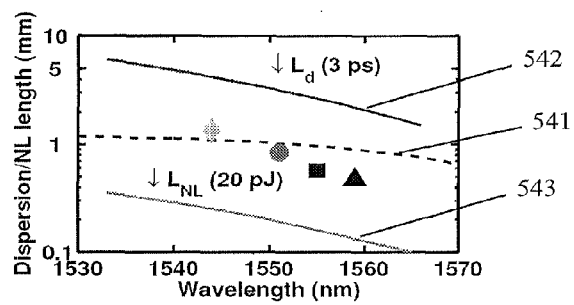

In FIG. 5(d), exemplary corresponding dispersion lengths, $L_d$, (for $\tau_p$ of 3 ps pulses) and nonlinear lengths, $L_{NL}$, (input energy 20 pJ) for comparison at the different wavelengths are illustrated. The exemplary dashed curve 541 can be the effective length, $L_{eff}$. The filled points can be the optimal sample length, $z_{opt}$ for an input energy ($E_c$) of 20 pJ as a function of $n_g$. The exemplary calculated optimal sample lengths $z_{opt}$ can be provided at which ideal compression effects for these parameters are shown as filled points. At about 1544 nm ($n_g$ at about 6.9), $z_{opt}$ can be about 1.7 mm (FIG. 5(d)), which can be significantly longer than $L_{eff}$=about 1.1 mm, thus $z_{opt} > L_{eff}$ and the conditions for compression may not met in this example. With the pulse centered at about 1551 nm, $z_{opt} \sim L_{eff}$=about 1.0 mm, which can account for the near-ideal compression observed in the measurements, for example. At about 1555 nm, $z_{opt}$ can be about 0.61 mm, while $L_{eff}$=about 0.97 mm, indicating the pulse can attain its minimum width before exiting the waveguide. As a consequence, the pulse width at the output can increase when further increasing coupled pulse energy, for example. This can be confirmed below with numerical modeling. The complementary metric of calculating the optimal coupling energy $E_c$ such that $z_{opt}$=$L_{eff}$ can also be considered, for example. The autocorrelation data, (e.g., as shown in FIG. 4(c)), can confirm that optimal narrowing can be achieved around 12 pJ at about 1555 nm.

The propagation of optical pulses in a slow-light PhC waveguide can be rigorously modeled through the nonlinear Schrödinger equation (NLSE). In contrast to gap solitons, which can be approximately described as superposition of Bloch modes at both band edges (see, e.g., A. De Rossi, C. Conti, and S. Trillo, Stability, Multistability, and Wobbling of Optical Gap Solitons, *Phys. Rev. Lett.* 81, 85 (1998), and reference therein), here only the lower band (even mode, as shown in FIG. 2(b)) can be excited and the band edge not reachable because of large backscattering (see, e.g., C. Husko, S. Combrié, Q. V. Tran, F. Raineri, C. W. Wong, and A. De Rossi, Non-trivial scaling of self-phase modulation and three-photon absorption in III-V photonic crystal waveguides, *Optics Exp.* 17, 22442 (2009)). Under these conditions the PhC can behave as a single-mode waveguide, where dispersion and nonlinearity can be referred to Bloch modes (see, e.g., N. A. R. Bhat and J. E. Sipe, Optical pulse propagation in nonlinear photonic crystals, *Phys. Rev. E* 64, 056604 (2001)) in lieu of translation-invariant modes. An exemplary complete NLSE model can be described by, e.g.:

$$\frac{\partial E}{\partial z} = -\frac{1}{v_g}\frac{\partial E}{\partial t} - i\frac{\beta_2}{2}\frac{\partial^2 E}{\partial t^2} + \frac{\beta_3}{6}\frac{\partial^3 E}{\partial t^3} - \frac{\alpha_1}{2}E + i\gamma_{eff}|E|^2 E - \frac{\alpha_{3eff}}{2}|E|^4 E + \left(ik_o\delta - \frac{\sigma}{2}\right)N_c E. \quad (1)$$

This can include exemplary third-order dispersion $\beta_3$, exemplary linear propagation loss $\alpha$, exemplary effective slow-light three-photon nonlinear absorption $\alpha_{3eff}$ and exemplary effective nonlinear parameter $\gamma_{eff}$ (as described further herein below), and generated exemplary carrier density $N_c$ with associated exemplary free-carrier dispersion $\delta$ and exemplary absorption $\sigma$. The exemplary auxiliary carrier equation can introduce a non-instantaneous response through the carrier lifetime $$\tau_c: \frac{\partial N_c}{\partial t} = \frac{\alpha_{3eff}}{3\hbar\omega A_{3eff}}|E|^6 - \frac{N_c}{\tau_c}.$$

The exemplary free-carrier dispersion coefficient $\delta$ can include $n_g$ scaling:

$$\delta = -\frac{q^2}{2\omega^2\varepsilon_o n_o m^*}\frac{n_g}{n_o}.$$

Exemplary $\sigma$ can be about $4\times10^{-21}(n_g/n_o)$ m$^2$ based on literature, with bulk index $n_0$. Exemplary embodiments according to the present disclosure can solve the NLSE model by employing an implicit Crank-Nicolson split-step method. Exemplary parameters can be obtained, e.g., directly from measurements or calculated as required. Exemplary third-order dispersion, which can be included in the exemplary model, can provide a small contribution throughout the range of parameters examined here and higher-order dispersion can be negligible. Free-carrier effects only play a minimal role, except at the larger pulse energies and elevated group indices.

In an exemplary embodiment, the pulse temporal width (as shown in the graphs of FIGS. 6(a) and 6(b)) and output spectra (the latter not shown) can be calculated as a function of the coupled pulse energy. The model can facilitate a simultaneous agreement with both the autocorrelation and spectra with no degrees of freedom. The centre peak of the pulse can overlap well with a hyperbolic secant and can carry a portion of the total pulse energy (56%). The procedure can be repeated for the pulse at 1,555 nm and a value of 720 fs can be retrieved (76% pulse energy in the centre peak). The quality factors here can be restricted by three-photon absorption, which caps the maximum peak power. In particular, FIGS. 6(c) and 6(d) show graphs of the pulse optical phase w, which can be flat across the main peak for the two cases at 1,551 nm and 1,555 nm. This can correspond to a balance of SPM and GVD at the output, and further strengthens the conclusion that the main peak can indeed be a soliton.

The main exemplary impact of the dissipative terms in the NLSE can be to "slow" down the soliton dynamics, e.g. to increase the effective spatial scale. An additional effect of the loss can be strong attenuation such that the periodic property of higher-order solitons can be ultimately destroyed. Exemplary three-photon absorption can effectively prevent optical pulses from attaining the large peak power that can be required to sustain very short solitons, thereby setting the ultimate compression limit, for example. Exemplary output spectra (see, e.g., FIG. 3) and the expected pulse width depending on the coupled energy of the pulse can be calculated. Numerical simulations for the measurements shown in the graphs of FIGS. 4(a)-4(d) are provided herein below. As shown in FIGS. 5(b)-5(d) via the solid lines therein, a complete exemplary model in accordance with the present disclosure can demonstrates an appropriate quantitative agreement with experimental results and confirm that the dominant effect can be soliton compression, for example.

Based on the correspondence between the exemplary model and exemplary results of the experiment illustrated in this example, further consideration can be provided with respect to the autocorrelation trace corresponding to the shortest pulse resulting at 1551 nm. FIG. 8(a) illustrates that an exemplary calculated autocorrelation can overlap the experimental trace remarkably well. Therefore, rather than using a deconvolution coefficient, which can be, e.g., strictly valid for a hyperbolic secant, it can be safely presumed that the pulse width can be extracted directly from the calculated output pulse field (not, e.g., the autocorrelation) (see, e.g., FIG. 8(c)). Indeed a full-width half-maximum pulse width of 580 fs resulted, in agreement with the data presented in FIG. 5(a), for example. The center peak of the pulse can overlap almost perfectly with a hyperbolic secant and carry a substantial amount of the total pulse energy (about 56%).

FIGS. 8(a)-8(g) show graphs of exemplary characterization of the optical soliton.

FIG. 8(a) illustrates a graph of exemplary measured autocorrelation traces (dots) 511 with, at 1551 nm with pulse energy of 22 pJ. In FIG. 8(a), is the graphs show exemplary compression factor $\chi_c$ and exemplary compression quality factor $Q_c$ (=$P_{peak}/F_c$, where $P_{peak}$ can be, e.g., the output peak intensity normalized to the input peak intensity) (see, e.g., M.

Patterson, S. Hughes, S. Combie, N.-V. Quynh Tran, A. De Rossi, R. Gabet and Y. Jaouen, Disorder induced coherent-scattering in slow light photonic crystal waveguides, *Phys. Rev. Lett.* 102, 253903 (2009)), which can be measured experimentally and confirmed by numerical simulation. FIG. 8(b) shows a graph in which, at 1555 nm with pulse energy of 13 pJ, corresponding calculated autocorrelation traces (solid) 822 and fit with an hyperbolic secant (dashed) 823. The exemplary experimental compression factor $\chi_c$ and quality factor $Q_c$ are shown in the insets. c, and d, calculated pulse shapes 832, 842 corresponding to the exemplary traces illustrated in FIGS. 8(a) and 8(b) and fit with hyperbolic secant. In contrast with fiber literature where the dominant effect at larger intensities can be intrapulse Raman scattering (see, e.g., G. P. Agrawal, *Nonlinear Fiber Optics*, Academic Press, San Diego, Calif., (2007)), the maximum peak power in this semiconductor PhC waveguide can be limited by three-photon absorption and accompanying free-carrier absorption, thus imposing an upper bound on the compression and quality factors, for example. The exemplary procedure can be repeated for the shortest pulse at about 1555 nm and the value of exemplary 720 fs can be retrieved (exemplary 76% pulse energy in center peak). In FIG. 8(e), exemplary pulse optical phase, $\phi$, is plotted, which can be flat across the main peak for the two exemplary cases (1551 nm and 1555 nm). For example, the exemplary calculated phase can be flat, indicating the balance of self-phase-modulation and GVD, e.g. the formation of an optical soliton. This can correspond to a near perfect balance of self-phase-modulation and GVD at the output and further strengthen the conclusion that the main peak can be, indeed, a soliton.

FIG. 8(f), illustrates a graph of an exemplary simulated pulse propagation along the PhC waveguide at 1551 nm with input energy 17 pJ, which can correspond to an exemplary optimal value for this set of sample parameters (nonlinearity and dispersion lengths). The upper part of the curves 822 correspond to peak power values above the input peak power that can be characteristic of pulse compression. Despite losses, the peak power of the compressed pulse can be well above the input power of about 4.7 W, reaching a maximum of about 8.0 W, in agreement with soliton compression theory and limited only by three-photon absorption. In this example, the peak occurs at about exactly the sample output, thus confirming that $z_{opt} \sim L_{eff}$=about 1.0 mm for this wavelength. FIG. 8(g) illustrates a similar exemplary graph as is illustrated in FIG. 8(f), except at 1555 nm and 20 pJ. This coupled energy can be non-optimal for this sample length and thus the maximum compression can occurs before the pulse reaches the sample output, for example. For example, this graph is provided for the exemplary 1555 nm case (larger $n_g$=9.3) at 20 pJ. This coupled energy can be non-optimal for the effective sample length ($L_{eff}$=0.97 mm while $z_{opt}$=0.61 mm) for these parameters and thus the maximum compression can occur before the soliton pulse can reach the sample output, as elucidated above, for example.

In addition, for an exemplary anomalous dispersion waveguide with positive chirp, it is possible that exemplary temporal compression can be observed in the initial lengths of the waveguide without self-phase modulation or soliton formation, for example. This effect can be negligible and verified via a number of exemplary methods. For example, first, as the input pulses can be nearly transform-limited, pre-input chirp can be very small. Further, at low power (less than about 1 pJ), it can be observed that the output pulse width can be virtually identical (within measurement error) to the input pulse. Third, the exemplary compression can be related to the increase of the coupled energy, controlled with an exemplary fiber attenuator, whereas the input pulse shape can remain unmodified throughout the procedure. In addition, the Raman contribution and related self-frequency shift (see, e.g., F. X. Kärtner, D. J. Doughery, H. A. Haus and E. P. Ippen, Raman noise and soliton squeezing, *J. Op. Soc. Am. B* 11, 1267 (1994); J. I. Dadap, N.C. Panoiu, Xiaogang Chen, I-Wei Hsieh, Xiaoping Liu, Cheng-Yun Chou, E. Dulkeith, S. J. McNab, Fengnian Xia, W. M. J. Green, L. Sekaric, Y. A. Vlasov, and R. M. Osgood, Jr, Nonlinear-optical phase modification in dispersion-engineered Si photonic wires, *Optics Exp.* 16, 1280 (2008); and J. F. McMillan, M. Yu, D.-L. Kwong, and C. W. Wong, Observations of spontaneous Raman scattering in silicon slow-light photonic crystal waveguides, *Appl. Phys. Lett.* 93, 251105 (2008)) can be negligible at exemplary power levels for this material, as seen in, e.g., exemplary pulse spectra measurements. Further increase of the compression factor can rely on suppression of three-photon absorption with improved materials and nanofabrication, along with examinations of dispersion-managed solitons for chirped or flat dispersion at low group velocities, for example. It is also possible that precise chirp control in the input pulses can allow self-similar solitons (see, e.g., J. M. Dudley, C. Finot, D. J. Richardson, and G, Millot, Self-similarity in ultrafast nonlinear optics, *Nature Physics* 3, 597 (2007)) towards robust high-power solitons and ultrafast all-optical pulse synthesis and regeneration, for example.

Figure 7A:
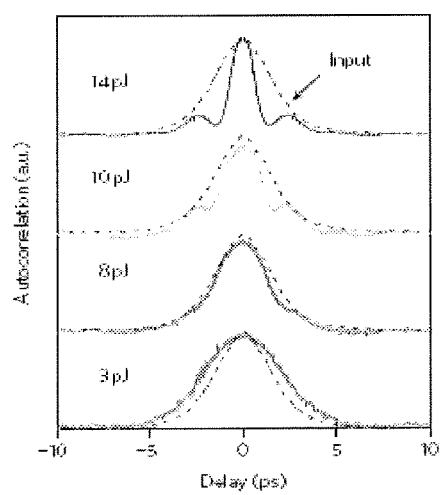
FIGS. 7(a)-7(b) are graphs of exemplary measurements demonstrating the optical soliton formation according to exemplary embodiments of the present disclosure.
Figure 7B:
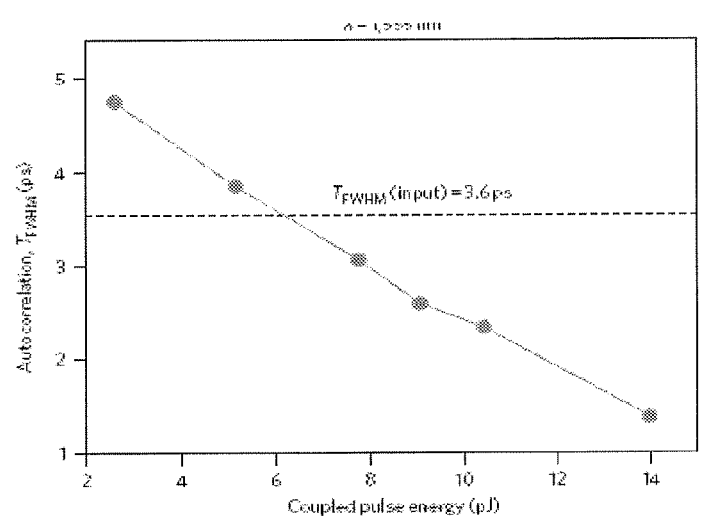

Additional exemplary embodiments of the present disclosure can provide further exploration of the soliton regime with shorter pulses, so that the dispersion length can be shorter than the device length, L. In the exemplary embodiment, asymmetric pulses with an FWHM duration of ~1.8 ps can be input and a spectral width of ~1.2 nm centered at 1,555 nm, giving a shortened dispersion length $L_d$ of ~1.1 mm (compared with 2.82 mm). Under these conditions ($L>L_d$), dispersion-induced broadening at the lowest pulse energies can be observed (weak nonlinear effects, e.g., see FIG. 7(a). As the pulse energy is increased, the output pulse can return to the input duration before further compressing to a smaller duration of 800 fs (see FIG. 7(b)), which can be limited by the output power of the laser. Despite the almost triangular autocorrelation input trace (different from a hyperbolic secant input), the output pulse can be similar to that previously obtained with a different pulse shape but comparable energy. The ability of a pulse to redistribute its energy into a hyperbolic secant form is a favorable property of solitons.

A potential degradation of noise due to soliton dynamics in the PhC can also be verified according to certain exemplary embodiments of the present disclosure. Using the Von der Linde method, the radiofrequency spectra with 10 Hz resolution as a function of the harmonic order of the laser alone, and after the sample can be compared. No discernable difference in the electrical spectra in terms of the ratio between the integrated noise pedestal and the signal spectral peak for several harmonics up to n=150 can be observed, within measurement accuracy.

Recent developments in integrated photonics have focused on size and the power budget, as well as speed. Laser diodes offer a possible route towards the integration of subpicosecond optical sources. Recent advances in monolithic mode-locking based on quantum dots have pushed pulse widths to below 1 ps, sometimes at the expense of the repetition rate and time-bandwidth product, based on the trade-off optimization of the absorber/gain sections for each cavity length. In parallel to the development of these chip-scale light sources, soliton-effect pulse compression in PhCWGs, such as the exemplary embodiment according to the present disclosure, can be cascaded with laser diodes, further compressing pulses deeper into the ultrafast regime in an integrated fashion.

In accordance with certain exemplary embodiments of the present disclosure, exemplary pulse compression based on high-order solitons at moderately-slow group velocities in GaInP photonic crystal waveguides have been demonstrated. This can be facilitated, e.g., by the enhanced nonlinearity (self-phase modulation) and strong negative group velocity dispersion in the photonic crystal waveguides. Use of a material free of two-photon absorption can dramatically reduce the impact of nonlinear absorption and free-carrier dispersion, thus preventing detrimental interference with the soliton dynamics, for example. Despite the complexity inherent in photonic crystals, the soliton dynamics can emerge from direct temporal and spectral measurements and can be further reinforced with an accurate nonlinear Schrödinger model, leading to, e.g., an excellent quantitative agreement with experiments. A significant difference with the ideal soliton dynamics can be, e.g., that the periodic evolution can be broken, leading to a conversion of injected high-order solitons into the fundamental soliton. Owing to the small size of the device (about 1.3-mm) and record low energy (about 12 pJ), these exemplary results can be potentially used in and/or with, e.g., the integration of femtosecond applications in photonic chips.

Exemplary Linear Transmission Properties of the Sample.

Figure 9:
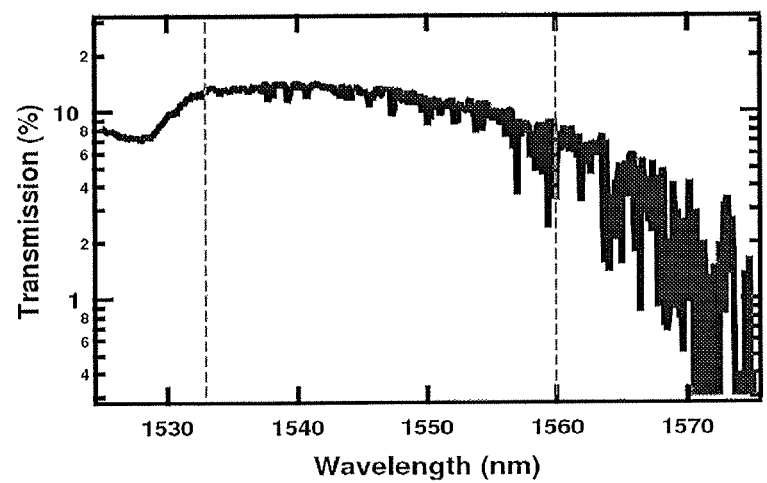
FIG. 9 is a graph of exemplary transmission of the 1.3-mm PhC waveguide according to exemplary embodiments of the present disclosure.

Exemplary transmission of the 1.3-mm PhC waveguide can be illustrated in the graph of FIG. 9. For example, a total insertion loss (before and after coupling optics) can be, e.g., estimated to be about 8 dB, including about 4 dB directly attributable to the coupling optics. Carefully designed integrated mode-adapters can reduce waveguide coupling losses and suppress Fabry-Perot oscillations from facet reflections (see, e.g., Q. Tran, S. Combrié, P. Colman, and A. De Rossi, Photonic crystal membrane waveguides with low insertion losses, *Appl Phys. Lett.* 95, 061105 (2009)). The 3-dB optical transmission band can extend between about 1530 nm and about 1560 nm and can be bounded by the onset of the higher order odd mode and the even-mode waveguide cut off.

Exemplary Nonlinear (Three-Photon) Absorption of the PhC Sample

Figure 10:
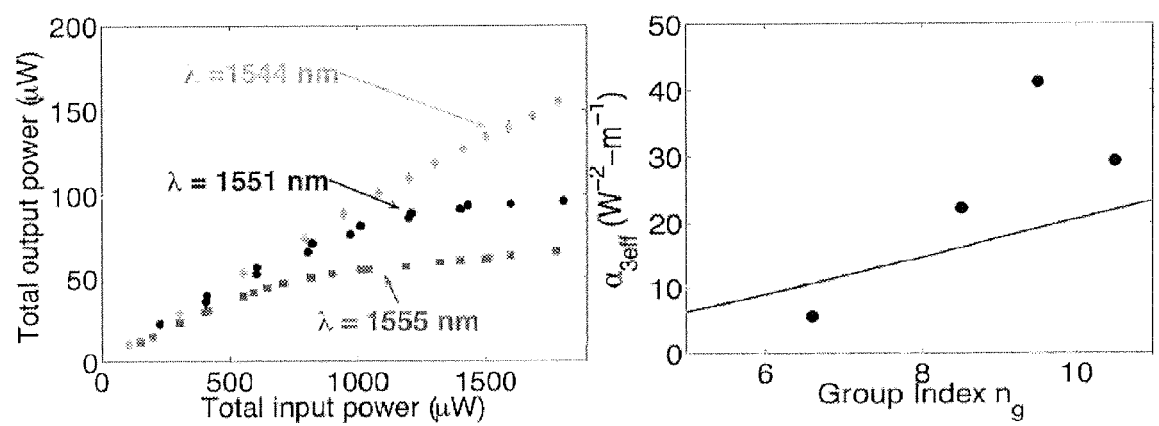
FIG. 10 are graphs of exemplary nonlinear and input-output transmission characterizations of a photonic crystal according to exemplary embodiments of the present disclosure.

The nonlinear absorption can be revealed by output versus input power measurements as shown at a left graph of FIG. 10. For example, FIG. 10 illustrates exemplary graphs of output versus input average power measured before (after) the coupling optics, i.e., objective-chip-objective values. Maximum power corresponds to about 20 pJ coupled energy per pulse. The right graph shows effective nonlinear absorption parameter $a_{3\mathit{eff}}$ (points—experiment, line—theory). ThPA can be negligible for lowest pulse energies in the experiment and can begin to have an impact at larger energies. This can be apparent for the exemplary embodiments having center pulse wavelengths of 1551 and 1555 nm. The abrupt saturation can be reinforced by the compression effect. The wavelength-dependent effective nonlinear three-photon absorption (ThPA) parameters $a_{3\mathit{eff}} = a_f(n_g/n_0)^3$ in FIG. 10 (right) are measured as in Husko, C. et al. Non-trivial scaling of self-phase modulation and three-photon absorption in III-V photonic crystal waveguides. Opt. Express 17, 22442-22451 (2009).

Exemplary Nonlinear Schrödinger Equation (NLSE) Parameters

The exemplary parameters used in the exemplary calculations are provided in Table S1. The exemplary effective nonlinear parameters $a_{3\mathit{eff}}$ and $\gamma_{\mathit{eff}}$ were experimentally measured as in C. Husko, S. Combrié, Q. V. Tran, F. Raineri, C. W. Wong, and A. De Rossi, Non-trivial scaling of self-phase modulation and three-photon absorption in III-V photonic crystal waveguides, *Optics Exp.* 17, 22442 (2009). The bulk Kerr $n_2=0.57\times10^{-17}$ m$^2$/W (see, e.g., M. Sheik-Bahae, D. J. Hagan, and E. W. Van Stryland, Dispersion and band-gap scaling of the electronic Kerr effect in solids associated with two-photon absorption, *Phys. Rev. Lett.* 65, 96 (1990)) and $\alpha_3=2.5\times10^{-26}$ m$^3$-W$^{-2}$ coefficients employed in the calculations were found to be in agreement with well-known models, experimentally verified for the similar AlGaAs material (see, e.g., G. A. Siviliglou, S. Suntsov, R. El-Ganainy, R. Iwanow, G. I. Stegeman, D. N. Christodoulides, R. Morandotti, D. Modotto, A. Locatelli, C. De Angelis, F. Pozzi, C. R. Stanley, and M. Sorel, Enhanced third-order nonlinear effects in optical AlGaAs nanowires, *Optics Exp.* 14, 9377 (2006)). The values in Table S1 can be calculated given the definitions $\gamma_{\mathit{eff}}=n_2 k_0 n_g^2/A_{3\mathit{eff}}$ and $\alpha_{3\mathit{eff}}=\alpha_3 n_g^3/A_{5\mathit{eff}}^2$, with the non-linear effective defined in a similar way as in S. G. Johnson and J. D. Joannopoulos, Block-iterative frequency-domain methods for Maxwell's equations in a planewave basis, *Optics Exp.* 8, 173 (2001) as:

$$\frac{1}{A_{3\mathit{eff}}} = \frac{a\int_{cell} n^2\kappa|\vec{E}|^4 dV}{\left(\int_{cell} n^2|\vec{E}|^2 dV\right)^2}$$

and $$\frac{1}{A_{5\mathit{eff}}^2} = \frac{a^2\int_{cell} n^3\kappa|\vec{E}|^6 dV}{\left(\int_{cell} n^2|\vec{E}|^2 dV\right)^3},$$

with a the lattice period, Cell meaning the volume of one waveguide period, n the refractive index and κ a function giving the ratio of the local value of nonlinear parameter to the value used in formula, for example. Specifically, e.g., for the structure with holes, κ=1 in the membrane and 0 outside. According to some exemplary embodiments, E can be the vector electric field distribution of the waveguide Bloch modes derived via, e.g., the planewave expansion method (see, e.g., N. A. R. Bhat and J. E. Sipe, Optical pulse propagation in nonlinear photonic crystals, *Phys. Rev. E* 64, 056604 (2001)). Third-order nonlinear effects and linear propagation loss can be taken to increase with $n_g^2$ (see, e.g., S. Hughes, L. Ramunno, J. Young and J. E. Sipe, Extrinsic Optical Scattering Loss in Photonic Crystal Waveguides: Role of Fabrication Disorder and Photon Group Velocity, *Phys. Rev. Lett.* 94, 033903 (2005); and M. Soljačić and J. D. Joannopoulos, Enhancement of nonlinear effects using photonic crystals, *Nature Materials* 3, 211 (2004)), for example.

TABLE S1

Exemplary characteristic parameters of the GaInP PhCWG sample

| | | | | |
|---|---|---|---|---|
| λ (nm)* | 1544 | 1551 | 1555 | 1559 |
| group index $n_g$* | 6.9 | 8.3 | 9.3 | 10.5 |
| $\beta_2$ (ps$^2$-mm$^{-1}$)* | −0.69 | −0.91 | −1.1 | −1.3 |
| $\beta_3$ (ps$^3$-mm$^{-1}$)* | 0.03 | 0.05 | 0.06 | 0.08 |
| $\alpha_1$ (cm$^{-1}$)‡ | 2.2 | 2.5 | 3.2 | 6 |
| $\alpha_{3\mathit{eff}}$ (cm$^{-1}$-W$^{-2}$)† | 0.14 | 0.20 | 0.26 | 0.34 |
| $\gamma_{\mathit{eff}}$ (cm$^{-1}$-W$^{-1}$)† | 5.82 | 7.65 | 9.16 | 11.0 |

*Measured
†Calculated
‡Estimated

Exemplary Nonlinear Schrödinger Equation (NLSE) Simulation Results

FIGS. 11(a)-11(d) illustrate and demonstrates the exemplary graphs generated using an exemplary simulated autocorrelation procedure and accompanying spectra of the data illustrated in the graphs of FIGS. 4(a)-4(d). These simulations can be performed, e.g., as described herein. For example, all parameters being approximately identical to experimental measurements, or calculated as required. It can be seen that both the autocorrelation and spectra can correspond remarkably well given the complexity of the interaction between the various effects, for example. The autocorrelation procedure utilizing 1551 nm can reach a minimum near 20 pJ, whereas, for the exemplary 1555 nm case, a broader autocorrelation at these pulse energies can result, in agreement with exemplary experimental observations.

Figure 11A:
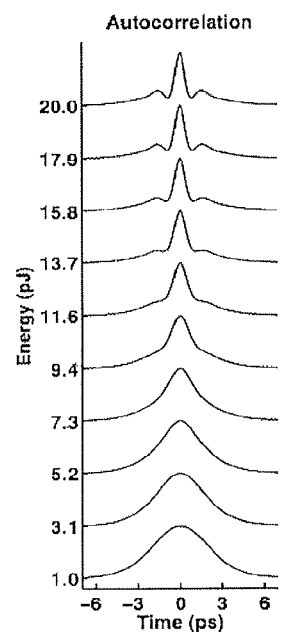
FIGS. 11(a)-11(d) are exemplary graphs generated by an exemplary simulated autocorrelation procedure and accompanying spectra of the data illustrated in FIGS. 4(a)-4(d)
Figure 11B:
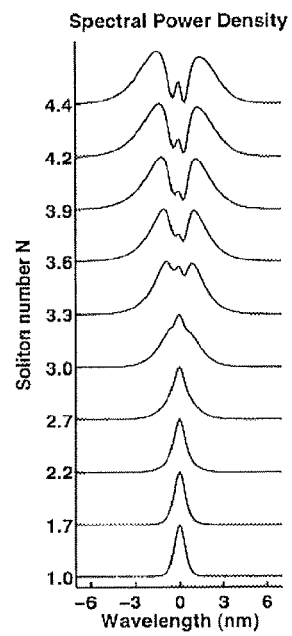
Figure 11C:
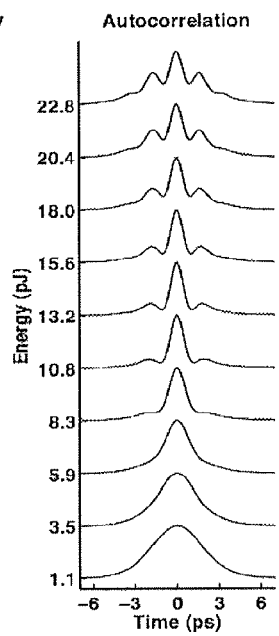
Figure 11D:
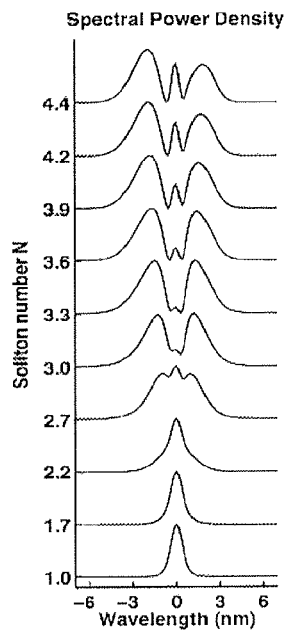

For example, exemplary intensity autocorrelation traces are illustrated in the graphs of FIGS. 11(a) and 11(c) of output pulses for increasing coupled pulse energies from about 1.7 pJ to about 22 pJ and corresponding spectra, as illustrated in the graphs of FIGS. 11(b) and 11(d). As shown in FIGS. 11(a) and 11(b), exemplary pulses centered at 1551 nm ($n_g$ of 8.3). FIGS. 11(c) and 11(d), exemplary pulses centered at about 1555 nm ($n_g$ of 9.3).

Exemplary Limitations on Soliton-Effect Compression Due to Three-Photon Absorption FIGS. 12(a)-12(e) illustrate graphs of exemplary full simulations of the NLSE at various wavelengths and group indices. For example, input powers can be 20 pJ. Directly to the right, FIGS. 12(f)-(j), shown is the equivalent case NLSE with suppressed three-photon absorption ($\alpha_3=0$) and suppressed free-carrier effects (N=0) that can otherwise dominate at such large intensities. Third-order dispersion effects can be considered, though they contribute negligibly.

Exemplary simulated pulse propagation along the PhCWG at 1533, 1544, 1551, 1555 and 1559 nm with input energy of about 20 pJ, respectively. The upper part of the curves shown in FIGS. 12(a)-12(e) (e.g., 821, 831, 841) correspond to exemplary peak power values above the input peak power that can be characteristic of pulse compression. f-j, same as ae, except with suppressed three-photon absorption ($\alpha_3=0$) and suppressed free-carrier effects (N=0).

At 1533 nm, as shown in FIGS. 12(a) and 12(f), dispersion and nonlinear effects can be extremely weak. Consequently the pulse changes negligibly over the sample length. The most striking effect of these simulations can be that the peak powers can be reduced from greater than 30 W with suppressed effects to the 8 W observed experimentally for 1551 nm and 1555 nm. As discussed herein, one of the impacts of the dissipative terms in the NLSE can be to "slow" down the soliton dynamics, e.g. to increase the effective spatial scale as well as the effective soliton order, N, over which the soliton evolution can be observed. This can be readily seen by comparing FIGS. 12(c) and 12(h). As shown in the graph of FIG. 12(h), the exemplary pulse can be maximally compressed at the sample output (L=1.3 mm), whereas in FIG. 12(c), the optimal sample length, $z_{opt}$, can be observed at, e.g., L=0.93 mm. At 1559 nm ($n_g$=10.5), the linear scattering losses dominate as mentioned in the paper S. Hughes, L. Ramunno, J. Young and J. E. Sipe, Extrinsic Optical Scattering Loss in Photonic Crystal Waveguides: Role of Fabrication Disorder and Photon Group Velocity, *Phys. Rev. Lett.* 94, 033903 (2005), with contribution from nonlinear losses.

The materials limited by two-photon absorption can experience far greater attenuation, (e.g. have lower peak powers). They also can be much longer length scales to observe the same phenomena as they possess a greatly diminished critical intensity, lest they trigger free-carrier effects (see, e.g., C. Monat, B. Corcoran, M. Ebnali-Heidari, C. Grillet, B. J. Eggleton, T. P. White, L. O'Faolain, and T. F. Krauss, Slow light enhancement of nonlinear effects in silicon engineered photonic crystal waveguides, *Optics Exp.* 17, 2944 (2009); and A. Baron, A. Ryasnyanskiy, N. Dubreuil, P. Delaye, Q. V. Tran, S. Combrié, A. de Rossi, R. Frey, G. Roosen, Light localization induced enhancement of third order nonlinearities in a GaAs photonic crystal waveguide, *Optics Exp.* 17, 552 (2009)). Three-photon absorption thus places a fundamental limit to the peak powers that can be produced from this mechanism. The extremely short pulse durations, even at peak powers in this range, can be useful in many applications.

Exemplary Temporal Soliton Compression with Tuned Low Group Velocity Dispersion Photonic Crystal Waveguides.

Figure 13:
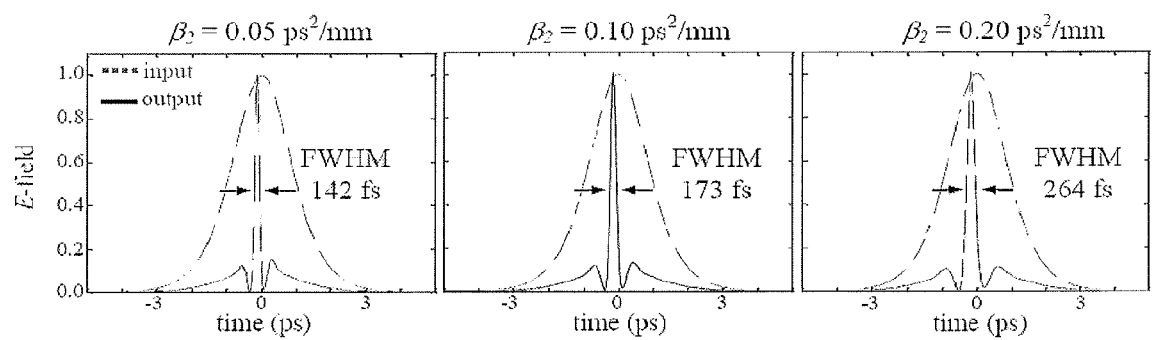
FIG. 13 are graphs of exemplary NLSE modeling of soliton compression according to exemplary embodiments of the present disclosure.

The control of group velocity dispersion in slow-light photonic crystal waveguides can allow soliton compression to shorter pulse widths. FIG. 13 shows graphs of exemplary modeled output and input pulse widths for $\beta_2$ values of approximately 0.05, 0.10, and 0.20 ps²/mm. The input pulse can be, for example, approximately 2 ps with 5 W peak power. The values employed in the simulation are identical to experimental parameters with the exception of modified $\beta_2$ values. As shown, with the suppressed two-photon absorption, pulse widths compressed down to approximately 150 fs or less is possible on-chip.

Figure 14:
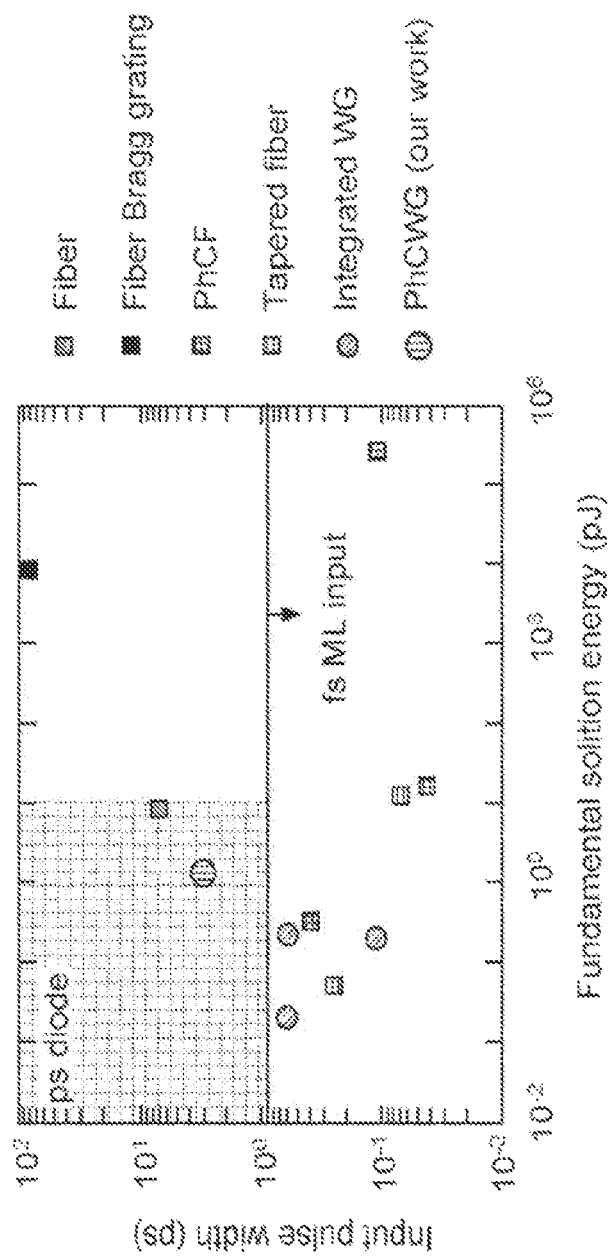
FIG. 14 is a graph comparing the performance of existing works with exemplary embodiments of the present disclosure.

FIG. 14 shows exemplary input pulse durations and energies employed in exemplary embodiments of the present disclosure. For example, FIG. 14 shows exemplary measured input pulse widths vs. fundamental soliton energies in nanophotonic (circles) and fiber (squares) systems. The shaded (grey) region denotes the regime accessible with laser diodes, with minimum ~ps pulse widths and up to ~10 pJ pulse energies. The dash line denotes measurements with femtosecond mode-locked (ML) pulse inputs. The input pulses can be in the regime where they can be provided by current picosecond semiconductor laser diodes—instead of bulk femtosecond solid-state lasers—for soliton compression into femtosecond pulses. This can extend the capabilities of picosecond laser diodes (with advantages such as compactness, direct electrical control and current applications in fluorescence lifetime spectroscopy for instance), allowing higher peak powers and finer temporal (probe) resolution. Further, in order to approach the $L/L_d$~1 regime, nanowire channel waveguides are preferably ~100× longer sample lengths (from the ~100× smaller $\beta_2$), which for the picosecond laser diodes regime, corresponds to tens of centimeters for each device length.

Exemplary Von Der Linde Measurements of Phase-Noise

Figure 15:
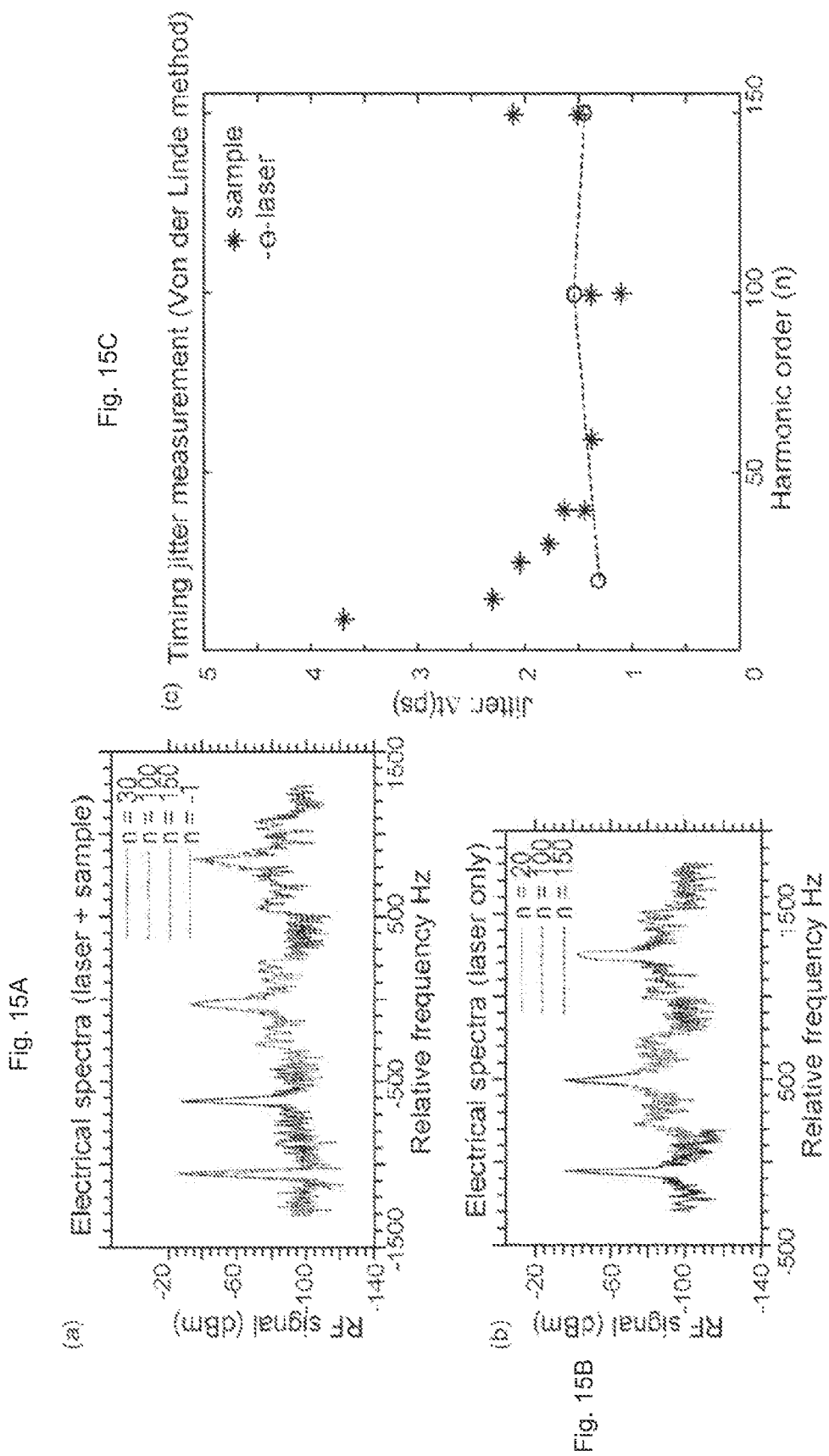
FIG. 15(a)-15(c) are graphs of exemplary RF spectra before and after soliton compression according to exemplary embodiments of the present disclosure.

FIGS. 15(a)-(c) show exemplary measurements of the RF spectra from the soliton compression, where FIG. 15(a) shows the spectra after propagating through the sample and FIG. 15(b) shows the spectra from the mode-locked laser itself. The pulse energies used can be ~20 pJ levels, which can induce soliton compression in the samples. FIG. 15(c) shows the resulting von der Linde noise characterization, which can show that there is little discernable difference in the optical pulse jitter before and after propagation in the photonic crystals, within the measurement accuracy.

Figure 16:
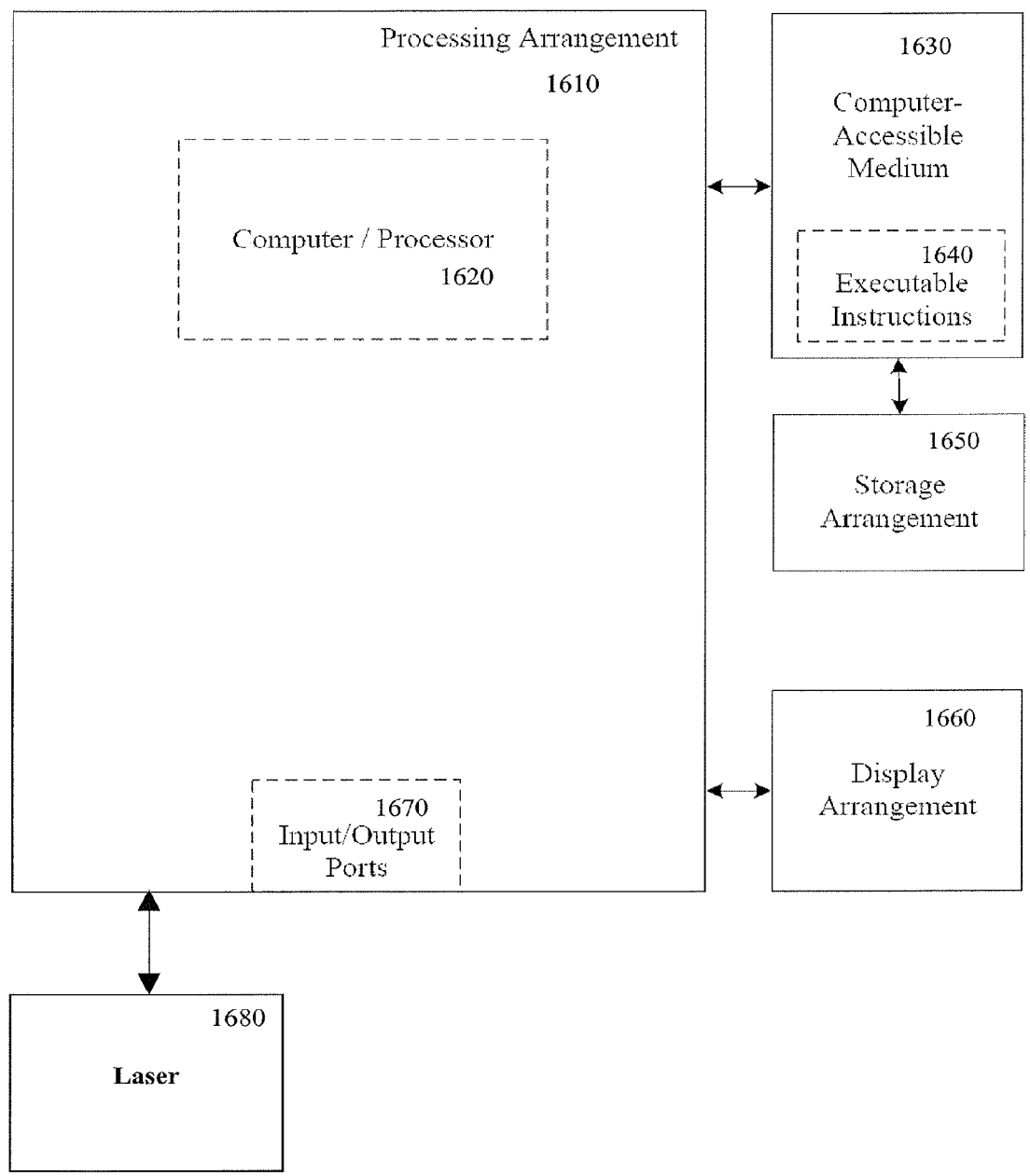
FIG. 16 is an exemplary diagram of an apparatus according to exemplary embodiments of the present disclosure.

FIG. 16 shows an exemplary block diagram of an exemplary embodiment of a system according to the present disclosure. For example, exemplary procedures in accordance with the present disclosure described herein can be performed by or controlled using a laser 1680 and hardware processing arrangement and/or a computing arrangement 1610. Such processing/computing arrangement 1610 can be, e.g., entirely or a part of, or include, but not limited to, a computer/processor 1620 that can include, e.g., one or more microprocessors, and use instructions stored on a computer-accessible medium (e.g., RAM, ROM, hard drive, or other storage device).

As shown in FIG. 16, e.g., a computer-accessible medium 1630 (e.g., as described herein above, a storage device such as a hard disk, floppy disk, memory stick, CD-ROM, RAM, ROM, etc., or a collection thereof) can be provided (e.g., in communication with the processing arrangement 1610). The computer-accessible medium 1630 can contain executable instructions 940 thereon. In addition or alternatively, a storage arrangement 1650 can be provided separately from the computer-accessible medium 1630, which can provide the instructions to the processing arrangement 1610 so as to configure the processing arrangement to execute certain exemplary procedures, processes and methods, as described herein above, for example.

Further, the exemplary processing arrangement 1610 can be provided with or include an input/output arrangement 1670, which can include, e.g., a wired network, a wireless network, the internet, an intranet, a data collection probe, a sensor, etc. As shown in FIG. 16, the exemplary processing arrangement 1610 can be in communication with an exemplary display arrangement 1660, which, according to certain exemplary embodiments of the present disclosure, can be a touch-screen configured for inputting information to the processing arrangement in addition to outputting information from the processing arrangement, for example. Further, the exemplary display 1660 and/or a storage arrangement 1650 can be used to display and/or store data in a user-accessible format and/or user-readable format.

Exemplary Methods

Exemplary Device and Linear Characterization. The photonic crystal can be designed and fabricated as a hexagonal lattice (p6m symmetry group) of air-holes arranged in a GaInP slab membrane ($n_0$=3.13). Fabrication of high-quality PhC based on III-V can be described in S. Combrié, S. Bansropun, M. Lecomte, O. Parillaud, S. Cassette, H. Benisty, and J. Nagle, Optimization of an inductively coupled plasma etching process of GaInP/GaAs based material for photonic band gap applications, *J. Vac. Sci. Technol. B* 23, 1521 (2005) and has achieved record quality-factors (Q>$10^6$) in III-V-based PhC cavities (see, e.g., S. Combrié, Q. Vy Tran, C. Husko, P. Colman, and A. De Rossi, High quality GaInP nonlinear photonic crystals with minimized nonlinear absorption, *Appl. Phys. Lett.* 95, 221108 (2009); and S. Combrié, A. De Rossi, Q. Tran, and H. Benisty, GaAs photonic crystal cavity with ultrahigh Q: microwatt nonlinearity at 1.55 μm, *Opt. Lett.* 33, 1908 (2008)). Total insertion loss (before and after coupling optics) can be estimated to be 8-dB, including 4-dB directly attributable to the coupling optics. Specifically designed integrated mode-adapters can reduce waveguide coupling losses and suppress Fabry-Perot oscillations from facet reflections (see, e.g., Q. Tran, S. Combrié, P. Colman, and A. De Rossi, Photonic crystal membrane waveguides with low insertion losses, *Appl. Phys. Lett.* 95, 061105 (2009)). The 3-dB optical transmission band (see FIG. 6 herein below) extends between 1530 nm and 1560 nm and can be bounded by the onset of the higher order odd mode and the even-mode waveguide cut off. The waveguide dispersion can be measured via the phase-shift method, a method which entails measuring the radio-frequency phase modulation of the optical carrier, while sweeping the optical frequency through the waveguide transmission (see, e.g., S. Combrié, A. De Rossi, L. Morvan, S. Tonda, S. Cassette, D. Dolfi and A. Talneau, Time-delay measurement in singlemode, low-loss photonic crystal waveguides, *Electron. Lett.* 42, 86 (2006)). The measured phase shift $\Delta\phi$ can be translated into a time delay through the relationship $\Delta T = \Delta\phi/2\pi f$ with f the optical carrier frequency and $\Delta T$ the propagation delay. The group index can thus be $n_g = c\Delta T/L$. The group-velocity dispersion ($\beta_2$) and third-order dispersion ($\beta_3$) coefficients can be obtained from fitting function numerical derivatives. Such exemplary device can be used together with the exemplary apparatus shown in FIG. 9.

Exemplary Pulse Characterization. For exemplary pulse compression experiments, a mode-locked fiber laser (Keopsys/Pritel) can be employed that can deliver nearly transform-limited 2.5 ps to 4 ps pulses at a about 22 MHz repetition rate. The source can be tunable from about 1525 to about 1565 nm. After adjusting the source to the desired wavelength, the pulse duration can be measured and the time-band product can be minimized to approach the Fourier-limit of hyperbolic secant pulses, e.g., ($\Delta\lambda\Delta\nu$=0.315) within about 5% (e.g., the chirp can be negligible). The pulse power can be modulated with a variable fiber attenuator, thereby preventing misalignment and undesirable modification of the pulse shape, for example.

According to certain exemplary embodiments of the present disclosure, exemplary autocorrelation traces can be recorded using, e.g., a PulseCheck APE autocorrelator directly coupled to the output of the waveguide. It is possible to not use any amplification in order to prevent artifacts and pulse distortion. Owing to the excellent mechanical stability of the exemplary system, arrangement and configuration ion accordance with the present disclosure, and the good stability of the mode-locked laser, it is possible to average over 256 autocorrelation traces, thereby improving signal-to-noise ratio, for example. In order to accommodate the significant change in pulse duration, it is possible to collect data with different measurement time spans (e.g., 5, 15 and 50 ps).

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. In addition, all publications and references referred to above can be incorporated herein by reference in their entireties. It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it can be explicitly being incorporated herein in its entirety. All publications referenced can be incorporated herein by reference in their entireties.

What is claimed is:

1. An apparatus for producing a radiation, comprising:
a photonic crystal waveguide arrangement which is (i) specifically structured and sized so as to be placed on an integrated circuit, and (ii) configured to, by soliton compression, produce the radiation having at least one pulse with a pulse-width of less than 30 picoseconds, wherein the photonic crystal waveguide arrangement includes a gallium indium phosphide photonic crystal membrane, and wherein the soliton compression has a compression ratio of at least 4.1.

2. The apparatus of claim 1, wherein the photonic crystal waveguide arrangement includes at least one characteristic that provides at least one non-linearity of at least 300 $W^{-1}m^{-1}$.

3. The apparatus of claim 1, wherein the photonic crystal waveguide arrangement includes at least one characteristic that provides at least one dispersion of at least 2.5 $ps^2/m$.

4. The apparatus of claim 1, wherein the photonic crystal waveguide arrangement includes at least one line defect of dielectric characteristic.

5. The apparatus of claim 1, wherein the photonic crystal waveguide arrangement includes a plurality of periodic features.

6. The apparatus of claim 1, wherein the pulse-width of the at least one pulse is less than 2 picoseconds.

7. The apparatus of claim 1, wherein the at least one pulse includes an associated pulse energy of less than 100 pico-Joules.

8. The apparatus of claim 1, wherein the at least one pulse includes an associated pulse energy of less than 10 pico-Joules.

9. The apparatus of claim 1, wherein the at least one pulse includes an associated time-bandwidth product characteristic of less than 0.4.

10. The apparatus of claim 1, wherein the photonic crystal membrane has a hexagonal lattice.

11. The apparatus of claim 10, the hexagonal lattice having a lattice constant of about 485 nm.

12. The apparatus of claim 1, wherein the size of the photonic crystal waveguide arrangement is approximately 1 millimeter.

13. The apparatus of claim 1, the radiation having at least one pulse with a pulse-Width of less than 1 picoseconds.

14. The apparatus of claim 1, wherein the soliton compression has a compression ratio of 4.1 to 5.4.

15. A method for producing a radiation, comprising:
generating a first radiation into a photonic crystal waveguide arrangement which is (i) specifically structured and sized so as to be placed on an integrated circuit, and (ii) configured to receive the first radiation and, by soliton compression, produce the radiation having at least one pulse with a pulse-width of less than 30 picoseconds, wherein the photonic crystal waveguide arrangement includes a gallium indium phosphide photonic crystal membrane, and wherein the soliton compression has a compression ratio of at least 4.1.

16. The method of claim 15, wherein the at least one pulse includes a pulse-width of less than 2 picoseconds.

17. The method of claim 15, wherein the at least one pulse includes an associated pulse energy of less than 100 pico-Joules.

18. The method of claim 14, wherein the at least one pulse includes a pulse energy of less than 10 pico-Joules.

19. The method of claim 15, wherein the size of the photonic crystal waveguide arrangement is approximately 1 millimeter.

20. A non-transitory computer readable medium including instructions thereon that are accessible by a hardware processing arrangement, wherein, when the processing arrangement executes the instructions, the processing arrangement performs at least one procedure comprising:
generating a first radiation into a photonic crystal waveguide arrangement which is (i) specifically structured and sized so as to be placed on an integrated circuit, and (ii) configured to receive the first radiation and, by soliton compression, produce a further radiation having at least one pulse with a pulse-width of less than 30 picoseconds, wherein the photonic crystal waveguide arrangement includes a gallium indium phosphide photonic crystal membrane, and wherein the soliton compression has a compression ratio of at least 4.1.

21. The non-transitory computer readable medium of claim 20, wherein the at least one pulse includes a pulse-width of less than 2 picoseconds.

22. The non-transitory computer readable medium of claim 20, wherein the at least one pulse includes an associated pulse energy of less than 100 pico-Joules.

23. The non-transitory computer readable medium of claim 20, wherein the at least one pulse includes an associated pulse energy of less than 10 pico-Joules.

24. The non-transitory computer readable medium of claim 20, wherein the size of the photonic crystal waveguide arrangement is approximately 1 millimeter.

* * * * *

UNITED STATES PATENT AND TRADEMARK OFFICE
CERTIFICATE OF CORRECTION

PATENT NO. : 8,989,533 B2
APPLICATION NO. : 13/546348
DATED : March 24, 2015
INVENTOR(S) : Alfredo De Rossi et al.

It is certified that error appears in the above-identified patent and that said Letters Patent is hereby corrected as shown below:

In the claims,

Column 22, lines 14-15, cancel Claim 18 and replace with the following:

18. The method of claim 15, wherein the at least one pulse includes a pulse energy of less than 10 pico-Joules.

Signed and Sealed this
Eleventh Day of August, 2015

Michelle K. Lee
*Director of the United States Patent and Trademark Office*